United States Patent
Ota et al.

(10) Patent No.: US 6,652,973 B2
(45) Date of Patent: Nov. 25, 2003

(54) GLASS-CERAMIC AND REFLECTING MIRROR SUBSTRATE

(75) Inventors: Takashi Ota, Kasugai (JP); Atushi Watanabe, Kasugai (JP); Kazuki Ohtoh, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/195,642

(22) Filed: Jul. 15, 2002

(65) Prior Publication Data

US 2003/0129414 A1 Jul. 10, 2003

Related U.S. Application Data

(60) Provisional application No. 60/340,022, filed on Dec. 10, 2001, and provisional application No. 60/309,889, filed on Aug. 3, 2001.

(30) Foreign Application Priority Data

Jul. 30, 2001 (JP) ........................................ 2001-228984
Nov. 28, 2001 (JP) ........................................ 2001-362117

(51) Int. Cl.⁷ .......................... B32B 17/06; B32B 18/00
(52) U.S. Cl. .................... 428/426; 428/432; 428/912.2; 501/69; 501/5
(58) Field of Search ................. 428/426, 432, 428/689, 699, 701, 702; 501/6, 8, 53–55, 66–69, 72–73, 123, 125, 153, 154; 362/296; 313/113

(56) References Cited

U.S. PATENT DOCUMENTS

| | | | |
|---|---|---|---|
| 4,341,872 A | | 7/1982 | MacDowell |
| 5,630,858 A | * | 5/1997 | Beier et al. ............. 65/102 |
| 5,695,725 A | | 12/1997 | Talmy et al. |
| 5,786,286 A | | 7/1998 | Kohli |
| 5,821,181 A | * | 10/1998 | Bethke et al. .......... 501/8 |
| 6,174,829 B1 | * | 1/2001 | Jean et al. ............... 501/32 |
| 6,323,585 B1 | * | 11/2001 | Crane et al. ............ 313/112 |
| 6,391,809 B1 | * | 5/2002 | Young ..................... 501/57 |

OTHER PUBLICATIONS

Patent Abstracts of Japan, vol. 017, No. 207 (P–1525), Apr. 22, 1993 & JP 04 348302 A (Okamoto Garasu KK), Dec. 3, 1992 *Abstract*.

* cited by examiner

Primary Examiner—Deborah Jones
Assistant Examiner—Arden Sperty
(74) Attorney, Agent, or Firm—Burr & Brown

(57) ABSTRACT

The present invention provides a glass-ceramic suitable as a material for forming a reflecting mirror substrate.

The glass-ceramic has celsian as a primary crystal phase and contains $SiO_2$, $Al_2O_3$, $BaO$, and $TiO_2$ as primary components and at least $Li_2O$ as a modification component, wherein the amount of $Li_2O$ is within a range of 0.05 to 1.0 wt. %. The glass-ceramic is substantially formed of a crystal phase of celsian alone, that is, the glass-ceramic is substantially free from hexacelsian crystal phase.

24 Claims, 12 Drawing Sheets

Results of melting at 1,500°C

Crystallization temperature: 800°C (at opening), magnification: 5,000

Crystallization temperature: 800°C (at center), magnification: 5,000

Crystallization temperature: 850°C (at opening), magnification: 5,000

Crystallization temperature: 850°C (at center), magnification: 5,000

Crystallization temperature: 900°C (at opening), magnification: 5,000

Crystallization temperature: 900°C (at center), magnification: 5,000

Crystallization temperature: 900°C (at opening), magnification: 1,000

Crystallization temperature: 900°C (at center), magnification: 1,000

Crystallization temperature: 900°C (at opening), magnification: 3,000

Crystallization temperature: 900°C (at center), magnification: 3,000

GLASS-CERAMIC AND REFLECTING MIRROR SUBSTRATE

CROSS REFERENCE TO RELATED APPLICATION

This application claims priority from U.S. Provisional Application Ser. No. 60/340,022, filed Dec. 10, 2001 and U.S. Provisional Application Ser. No. 60/309,889, filed Aug. 3, 2001, as well as Japanese Patent Application No. 2001-228984, filed Jul. 30, 2001 and Japanese Patent Application No. 2001-362117, filed Nov. 28, 2001, the entireties of which are incorporated herein by reference.

BACKGROUND OF THE INVENTION

1. Technical Field to Which the Invention Pertains

The present invention relates to glass-ceramics, and to a substrate of a reflecting mirror (hereinafter referred to as "reflecting mirror substrate"), the substrate being formed from the glass-ceramic.

2. Background Art

Glass-ceramics, exhibiting excellent heat resistance, are useful materials for forming various apparatus parts used at high temperatures. An example of an apparatus part used at high temperatures includes a reflecting mirror. Together with a light source lamp mounted thereon, the reflecting mirror constitutes an illumination apparatus. Since the temperature of the reflecting mirror rises by heat generated from the light source lamp, the reflecting mirror is required to have high heat resistance. Therefore, the substrate of the reflecting mirror must also exhibit high heat resistance. Conventional reflecting mirror substrates are generally formed from PYREX (registered trademark) glass exhibiting excellent heat resistance.

In recent years, light source lamps of high luminance have been employed in illumination apparatuses and cineprojectors. In accordance with this trend, a reflecting mirror which constitutes an illumination apparatus employing a light source lamp of high luminance is required to have enhanced heat resistance.

In order to meet such requirements, Japanese Patent Publication (kokoku) No. 7-92527 discloses a reflecting mirror substrate formed from glass-ceramic containing, as primary components, a β-spodumene solid solution and a β-eucryptite solid solution. Since the glass-ceramic, which is known as a low-expansion glass-ceramic, exhibits excellent heat resistance, a reflecting mirror of high heat resistance can be formed from the glass-ceramic.

U.S. Pat. No. 5,786,286 discloses a reflecting mirror substrate formed from another type of glass-ceramic. Unlike the aforementioned reflecting mirror substrate, the substrate disclosed in this patent is not used at high temperatures. The substrate is formed from a glass-ceramic containing hexacelsian as a primary crystal phase and having a degree of crystallinity of about 50%, and has a thermal expansion coefficient α (×10$^{-7}$/°C. as high as 78 to 88.

In the course of forming the aforementioned substrates, the glass raw materials of the glass-ceramic must be melted at a temperature as high as 1,500° C. or more, since the glass raw materials have high melting points. The substrates are formed by forming methods, such as press forming, roll forming, casting, or blow forming. In such forming methods, since the glass raw materials are melted at 1,500° C. or higher prior to formation of a substrate, the surface of the forming die employed is oxidized, and the surface is roughened at an early stage, resulting in a shortened service life for the forming die.

Particularly, when the surface of a forming die is roughened, the resultant substrate fails to have the desired surface roughness. When the surface of the forming die is roughened, in order to impart the predetermined surface roughness to a substrate to be formed, the forming die must be exchanged for a new forming die at an early stage, resulting in a great increase in the costs required to prepare a large number of forming dies to be exchanged and the costs required for exchanging the forming dies.

In previously filed Japanese Patent Application No. 2000-299507, the present applicant proposed a reflecting mirror exhibiting excellent heat resistance, in which the substrate of the mirror is formed from glass-ceramic containing primary components differing from those of glass-ceramic containing a β-spodumene solid solution and a β-eucryptite solid solution, and exhibiting heat resistance similar to that of the glass-ceramic.

The reflecting mirror includes a glass-ceramic substrate and a thin reflection film deposited on the substrate. The substrate is formed from a glass-ceramic having celsian as a primary crystal phase and containing $SiO_2$, $Al_2O_3$, and BaO as primary components and $TiO_2$ as a crystal nucleus component, and has a thermal expansion coefficient α (×10$^{-7}$/°C. of 30 to 45. The reflecting mirror does not involve the aforementioned problems attributed to the formation of reflecting mirror substrates, and exhibits excellent heat resistance.

SUMMARY OF THE INVENTION

The present inventors have conducted further studies on glass-ceramics having celsian as a primary crystal phase and containing $SiO_2$, $Al_2O_3$, BaO, and $TiO_2$ as primary components, the glass-ceramic constituting the aforementioned reflecting mirror substrate, and have found that $Li_2O$ serving as a specific modification component greatly contributes to crystal formation in the glass-ceramic, and that a glass-ceramic containing no hexacelsian crystals or very small amounts of hexacelsian crystals; i.e., glass-ceramic whose crystal phase is substantially formed of celsian alone, can be obtained by varying the $Li_2O$ content of the glass-ceramic.

The present invention has been accomplished on the basis of this finding. An object of the present invention is to provide a very useful glass-ceramic material for forming apparatus parts exhibiting excellent heat resistance, mechanical strength, and optical properties; and a substrate which is formed from the glass-ceramic material and constitutes a high quality reflecting mirror.

The present invention relates to a glass-ceramic, and a first glass-ceramic according to the present invention has a celsian primary crystal phase comprising $SiO_2$, $Al_2O_3$, BaO, and $TiO_2$ as primary components and $Li_2O$ as a modification component, and is characterized in that the amount of $Li_2O$ falls within a range of 0.05 to 1.0 wt. %.

A second glass-ceramic according to the present invention has a celsian primary crystal phase comprising $SiO_2$, $Al_2O_3$, BaO, and $TiO_2$ as primary components and $Li_2O$ and $K_2O$ as modification components, and is characterized in that the amount of $Li_2O$ falls within a range of 0.05 to 1.0 wt. %, and the amount of $K_2O$ is 1.5 wt. % or less.

Each of the glass-ceramics of the present invention may further comprise one or more modification components selected from the group consisting of $Na_2O$, $P_2O_5$, $B_2O_3$, $Sb_2O_3$, ZnO, and $Bi_2O_3$.

The present invention also relates to a reflecting mirror substrate. The reflecting mirror substrate of the present invention is a substrate on which a thin reflection film is deposited to thereby form a reflecting mirror, the substrate being formed from the first or second glass-ceramics of the present invention.

In the reflecting mirror substrate of the present invention, preferably, the glass-ceramic constituting the substrate has a thermal expansion coefficient α ($\times 10^{-7}$/°C.) in a range of 30 to 45, and the glass-ceramic has a crystal grain size in a range of 0.1 to 1 μm.

The reflecting mirror substrate of the present invention has a flexural strength in a range of 125 to 155 Mpa at room temperature, in a range of 145 to 175 Mpa at 300° C., and in a range of 180 to 220 Mpa at 600° C., and an elastic modulus in a range of 80 to 85 Gpa at room temperature, in a range of 70 to 75 Gpa at 300° C., and in a range of 35 to 40 Gpa at 600° C.

In the reflecting mirror substrate of the present invention, preferably, the shortest wavelength of light which passes through the glass-ceramic constituting the substrate is at least 800 nm when the glass-ceramic has a thickness of 0.1 mm, and the wavelength of light which passes, at a transmittance of 50%, through the glass-ceramic constituting the substrate is at least 850 nm when the glass-ceramic has a thickness of 0.1 mm.

In the reflecting mirror substrate of the present invention exhibiting the aforementioned properties, which has a thickness of 3 to 6 mm, the shortest wavelength of light which passes through the glass-ceramic constituting the substrate is at least 850 nm, and preferably, the shortest wavelength of light which passes through the glass-ceramic constituting the substrate is at least 1,000 nm.

In the first glass-ceramic of the present invention, a small amount of $Li_2O$, serving as an essential modification component, enhances meltability of the glass, promotes precipitation of celsian crystals, and increases the rate of growth of the celsian crystals. Therefore, by virtue of the synergistic effect of the primary components and the modification component, the melting point of the glass raw material of the glass-ceramic decreases to 1,450° C. or lower, which is considerably lower than the melting point of the glass raw material of the aforementioned conventional glass-ceramic; i.e., 1,500° C. or higher. In addition, the first glass-ceramic is substantially formed of a celsian crystal phase alone, by virtue of a crystallization temperature as low as at least 800° C. In the second glass-ceramic of the present invention, a small amount of $K_2O$, which is added as a modification component together with $Li_2O$, aids the function of $Li_2O$.

Therefore, the glass-ceramic of the present invention is a very useful glass material for forming various apparatus parts exhibiting excellent heat resistance, mechanical strength, and optical properties, and is a suitable material for forming such apparatus parts. The glass-ceramic is a suitable material for forming, for example, a reflecting mirror substrate, which is generally formed from a glass material.

When the glass-ceramic is formed into an apparatus part, the melting temperature of the glass raw material of the glass-ceramic can be determined to be 1,450° C. or lower, which is considerably lower than that of a conventional glass raw material (i.e., 1,500° C. or higher). Therefore, in the course of forming the apparatus part, oxidation of the surface of the forming die to be employed, which is attributed to heating at a high temperature, can be prevented, and roughening of the surface of the die at an early stage can be prevented, resulting in an extended service life for the forming die. As a result of the extended service life of the forming die, the frequency of exchanging forming dies can be reduced, and the number of forming dies to be prepared for exchange can be greatly reduced, contributing to a great reduction in the costs required for preparing forming dies and the costs required for operation of exchange.

Furthermore, since roughening of the surface of the forming die can be prevented, the following advantages are obtained: the roughness of the surface of the forming die, which is determined in accordance with the surface roughness as desired of an apparatus part to be formed, can be maintained for a long period of time; an apparatus part having a desired surface roughness can be easily formed; and apparatus parts having an appropriate surface roughness can be reliably formed over a long period of time.

The glass-ceramic of the present invention is a suitable material for forming a substrate on which a thin reflection film is deposited to thereby form a reflecting mirror (i.e., a reflecting mirror substrate). The thermal expansion coefficient α ($\times 10^{-7}$/°C.) of the glass-ceramic for the reflecting mirror substrate can be determined to be in a range of 30 to 45, and the crystal grain size of the glass-ceramic can be determined to be in a range of 0.1 to 1 μm. Therefore, the reflecting mirror substrate exhibits further excellent mechanical properties, thermal properties, and optical properties. A reflecting mirror including the substrate is suitably employed as a high-functional light source lamp of high luminance which generates a considerable amount of heat, and the reflecting mirror can be used over a long period of time.

In the present invention, when the compositions of glass raw materials are varied and crystallization temperature, etc. are regulated, various glass-ceramics of different properties, such as different flexural strengths, elastic moduli, and light transmittances, can be formed. By selecting an outstandingly excellent glass-ceramic from among such glass-ceramics of different properties, a high-quality reflecting mirror substrate exhibiting the below-described properties can be provided.

That is, a reflecting mirror substrate of high durability exhibiting excellent mechanical properties and thermal properties can be formed, which has a flexural strength in a range of 125 to 155 Mpa at room temperature, in a range of 145 to 175 Mpa at 300° C., and in a range of 180 to 220 Mpa at 600° C., and an elastic modulus in a range of 80 to 85 Gpa at room temperature, in a range of 70 to 75 Gpa at 300° C., and in a range of 35 to 40 Gpa at 600° C.

Also, a reflecting mirror substrate exhibiting excellent optical properties can be formed, in which the shortest wavelength of light which passes through a glass-ceramic constituting the substrate is at least 800 nm when the glass-ceramic has a thickness of 0.1 mm, and the wavelength of light which passes, at a transmittance of 50%, through the glass-ceramic constituting the substrate is at least 850 nm when the glass-ceramic has a thickness of 0.1 mm.

Also, a reflecting mirror substrate can be formed that exhibits all the aforementioned properties; i.e., a reflecting mirror substrate exhibiting excellent mechanical properties, thermal properties, and optical properties, which has a flexural strength in a range of 125 to 155 Mpa at room temperature, in a range of 145 to 175 Mpa at 300° C., and in a range of 180 to 220 Mpa at 600° C., and an elastic modulus in a range of 80 to 85 Gpa at room temperature, in a range of 70 to 75 Gpa at 300° C., and in a range of 35 to 40 Gpa at 600° C., in which the shortest wavelength of light which passes through a glass-ceramic constituting the substrate is at least 800 nm when the glass-ceramic has a thickness of 0.1 mm, and the wavelength of light which passes, at a transmittance of 50%, through the glass-ceramic constituting the substrate is at least 850 nm when the glass-ceramic has a thickness of 0.1 mm.

In view of the features of the aforementioned reflecting mirror substrates, the most preferable reflecting mirror substrate exhibits all the aforementioned properties and has a thickness of 3 to 6 mm, in which the shortest wavelength of light which passes through a glass-ceramic constituting the substrate is at least 850 nm, preferably at least 1,000 nm. The reflecting mirror substrate exhibits further excellent mechanical properties, thermal properties, and optical properties.

DETAILED DESCRIPTION OF THE INVENTION

The glass-ceramic of the present invention exhibits excellent heat resistance, mechanical strength, and optical properties, and is a very useful glass material for forming an apparatus part which must exhibit such properties.

The reflecting mirror substrate of the present invention is formed from the glass-ceramic of the present invention, exhibits excellent heat resistance, mechanical strength, and optical properties, and is very useful as a substrate of a reflecting mirror which must exhibit such properties.

The first glass-ceramic according to the present invention contains celsian as a primary crystal phase, $SiO_2$, $Al_2O_3$, BaO, and $TiO_2$ as primary components, and $Li_2O$ as a modification component, wherein the amount of $Li_2O$ falls within a range of 0.05 to 1.0 wt. %.

The second glass-ceramic according to the present invention contains celsian as a primary crystal phase, $SiO_2$, $Al_2O_3$, BaO, and $TiO_2$ as primary components, and $Li_2O$ and $K_2O$ as modification components, wherein the amount of $Li_2O$ falls within a range of 0.05 to 1.0 wt. %, and the amount of $K_2O$ is 1.5 wt. % or less.

The present inventors have focused on the requirement that, in order to impart excellent properties to a reflecting mirror which constitutes an illumination apparatus together with a light source lamp mounted on the mirror, the reflecting mirror must be formed of a substrate exhibiting excellent properties such as heat resistance, mechanical strength, and optical properties, and the substrate as well must be formed from a material exhibiting excellent properties such as heat resistance, mechanical strength, and optical properties. In view of the foregoing, the present inventors have performed studies on a suitable material for forming the reflecting mirror substrate.

On the basis of the realization that a glass-ceramic is a suitable material for forming a reflecting mirror substrate, the present inventors have focused on an $SiO_2$—$Al_2O_3$—BaO-based glass material which constitutes a glass-ceramic containing a crystal phase of celsian, and have performed tests in order to study the relation between components of the glass material, crystal phase, and thermal expansion coefficient $\alpha$.

Figure 1:
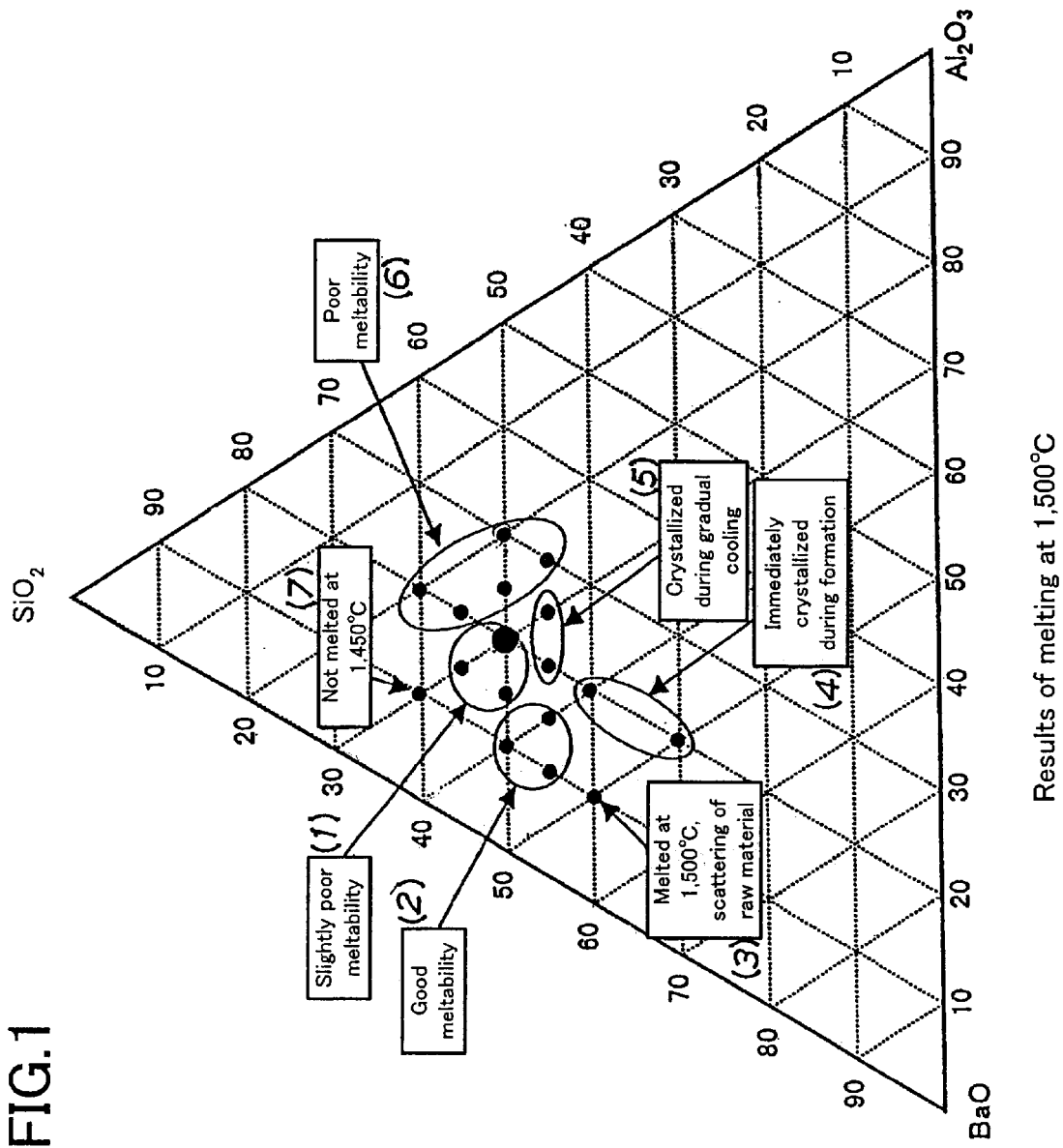
FIG. 1 is a graph showing the proportions of components of glass raw materials, and meltability and crystallization property of the glass raw materials when melted at 1,500° C.

FIG. 1 shows the results of the tests, and is a graph showing the relationship between the proportions of components of glass raw materials and the meltability and crystallization property of the glass raw materials. The graph shows the results of the tests in which glass raw materials containing $SiO_2$, $Al_2O_3$, and BaO as primary components (total amount: 100 wt. %) and $TiO_2$ as a crystal nucleus component (14 wt. %: excluded from the above total amount) are melted at 1,500° C. The graph shows seven specific zones; i.e., a first zone (1), a second zone (2), a third zone (3), a fourth zone (4), a fifth zone (5), a sixth zone (6), and a seventh zone (7), the seven zones corresponding to the glass raw materials melted at 1,450° C. to 1,500° C.

Although glass raw materials in the first zone (1) exhibit slightly poor meltability at 1450° C., they are considered to exhibit excellent crystallization property and heat resistance. Glass materials in the second zone (2) exhibit good meltability. Although a glass raw material in the third zone (3) exhibits good meltability, it scatters while being melted. Although glass raw materials in the fourth zone (4) exhibit good meltability, they are immediately crystallized when formed into products. Although glass raw materials in the fifth zone (5) exhibit good meltability, products formed from the materials are crystallized when being gradually cooled. Glass materials in the sixth zone (6) exhibit poor meltability at 1,450° C. A glass raw material in the seventh zone (7) exhibits poor meltability, and is not melted at 1,450° C.

Figure 2:
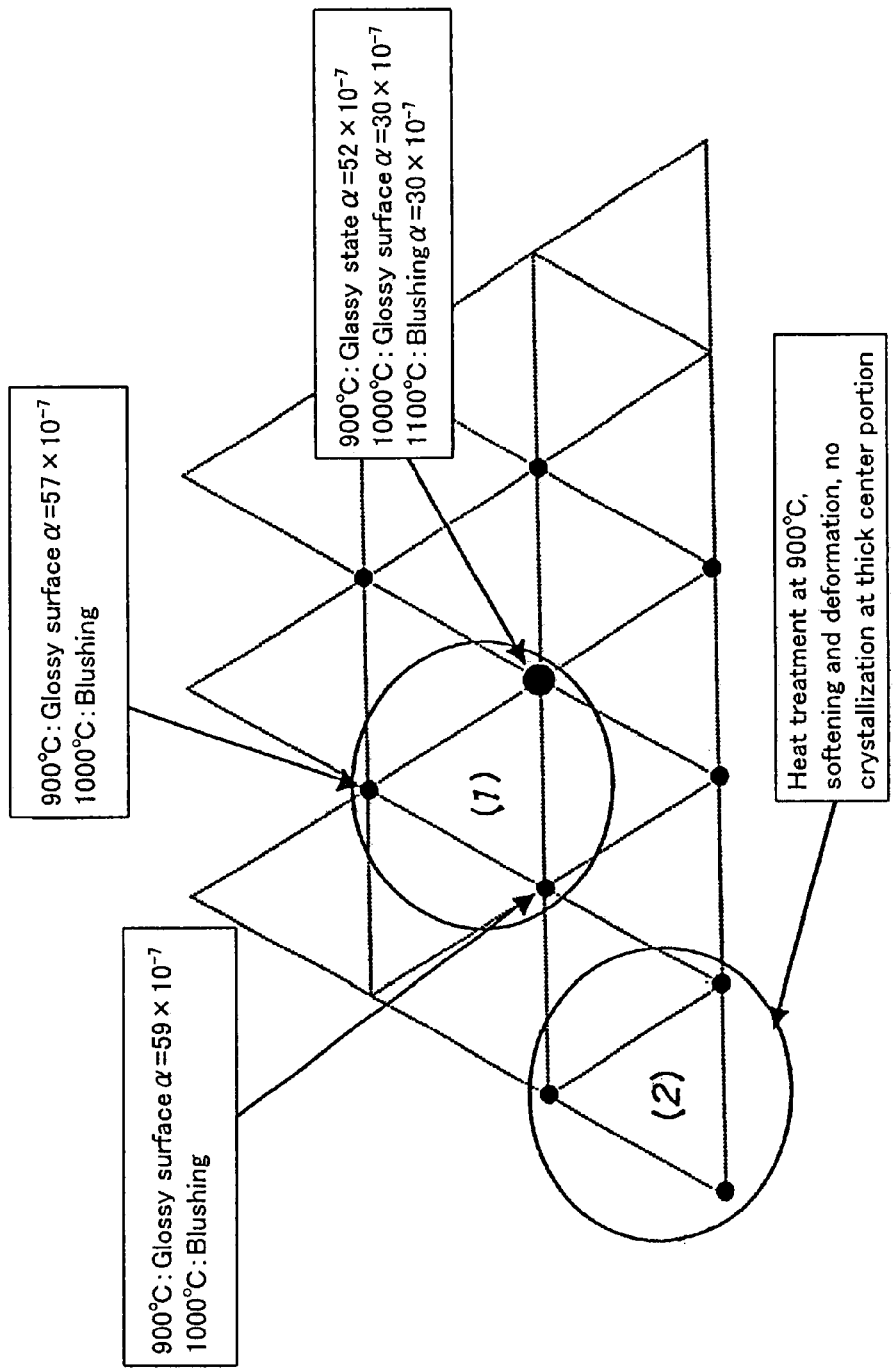
FIG. 2 is a graph showing the results of studies on the proportions of components of the glass raw materials in the first zone (1) and the second zone (2) shown in the graph of FIG. 1.

Further detailed studies have been conducted on the glass raw materials in the first zone (1) and the second zone (2), which are considered to exhibit excellent properties. FIG. 2 is a graph showing the results of the studies. FIG. 2 shows the results of the studies on the proportions of components of the glass raw materials in the first zone (1) and the second zone (2) shown in the graph of FIG. 1. The results show that although each of the glass raw materials in the second zone (2) exhibits good meltability at 1,450° C., when a product (i.e., a substrate) formed from the material is subjected to crystallization treatment (heat treatment) at 900° C., the product is softened and deformed, and the thick central portion of the product is crystallized only insufficiently.

Also, the results show that although the glass raw materials in the first zone (1) exhibit slightly poor meltability at 1,450° C., they exhibit good meltability at 1,500° C. and exhibit excellent crystallization property and heat resistance. When the total amount of $SiO_2$, $Al_2O_3$, and BaO of the glass raw materials in the first zone (1) is taken as 100 wt. %, the proportions of these components are as follows: $SiO_2$: 50 to 55 wt. %, $Al_2O_3$: 15 to 20 wt. %, and BaO: 30 to 35 wt. %.

On the basis of the aforementioned results of the test, the present inventors have focused on an $SiO_2$—$Al_2O_3$—BaO-based glass material, and have performed further studies on the reduction of the melting point of glass raw material containing $SiO_2$, $Al_2O_3$, BaO, and $TiO_2$ as primary components, on the crystallization property of a product formed from the glass raw materials, and on the heat resistance of the product after crystallization. As a result, the present inventors have found the advantages as described below.

When at least $Li_2O$ serving as a modification component is incorporated into the glass raw material containing the aforementioned components as primary components, the melting point of the glass raw material can be lowered to 1,450° C. or lower, which is considerably lower than 1,500° C. A glass product formed from the glass raw material having such a low melting point can be transformed into a glass-ceramic containing celsian as a primary crystal phase through heat treatment, and can be formed into a product exhibiting high heat resistance; i.e., a product having a thermal expansion coefficient α ($\times 10^{-7}/°C$.) in a range of 30 to 45. In addition, when heating temperature; i.e., crystallization temperature is regulated, the glass product can be formed into a product exhibiting further excellent mechanical properties and optical properties.

A very small amount of $Li_2O$ (as a modification component) incorporated into the glass raw material enhances meltability of the glass raw material, promotes precipitation of celsian crystals, and increases the rate of growth of the celsian crystals. The $Li_2O$ content of the glass raw material is preferably 0.05 to 1.0 wt. %. When the $Li_2O$ content is less than 0.05 wt. %, meltability of the glass raw material is impaired, whereas when the $Li_2O$ content exceeds 1.0 wt. %, devitrification property (optical property) is impaired during forming.

When at least $Li_2O$ and $K_2O$ serving as modification components are incorporated into a glass raw material containing the aforementioned components as primary components, $Li_2O$ functions in the glass raw material as described above, and a small amount of $K_2O$ aids the function of $Li_2O$. The $K_2O$ content of the glass raw material is preferably 1.5 wt. % or less. When the $K_2O$ content is high, precipitation of hexacelsian crystals as well as celsian crystals is promoted, resulting in deterioration of heat resistance and mechanical strength. Therefore, the $K_2O$ content is preferably 1.5 wt. % or less, more preferably 0.0 to 1.0 wt. %.

A glass raw material containing the aforementioned components has a melting point of 1,450° C., which is considerably lower than 1,500° C. A glass product formed from the glass raw material having such a low melting point can, through heat treatment, be transformed into a glass-ceramic whose crystal phase is substantially formed of celsian alone, and can be formed into a product exhibiting high heat resistance; i.e., a product having a thermal expansion coefficient α ($\times 10^{-7}/°C$.) in a range of 30 to 45. In addition, since the size of crystal grains in the glass-ceramic of the glass product can be reduced to a range of 0.1 to 1 $\mu$m; i.e., very fine crystal grains can be obtained, the reflection property of the glass product can be enhanced considerably.

In the present invention, when compositions of glass raw materials are varied and the crystallization temperature is appropriately regulated within a range of, for example, 800 to 900° C., various glass-ceramics exhibiting different properties, such as flexural strength, elastic modulus, and transmittance, can be formed. By selection of an outstandingly excellent glass-ceramic for a reflecting mirror from among the glass-ceramics of different properties, provision of a reflecting mirror substrate of high quality can be realized. Such a glass raw material containing the aforementioned components may contain, in addition to $Li_2O$ and $K_2O$, one or more modification components selected from the group consisting of $Na_2O$, $B_2O_3$, $Sb_2O_3$, ZnO, and $Bi_2O_3$.

In a manner similar to the case where a glass product is formed from a typical glass raw material, a glass raw material containing the aforementioned specific components is melted and fed to a forming die, and formed into a glass product having the same shape as a substrate by means of a forming method, such as press forming, roll forming, casting, or blow forming. When the glass product is formed, the melting temperature of the glass raw material can be regulated to 1,450° C. or lower in consideration of the melting point of the material.

Since the melting temperature of the glass raw material can be regulated as described above, in the course of formation of the glass product, oxidation of the surface of the forming die can be prevented, and roughening of the surface of the die can be prevented to a great extent. Therefore, the proper roughness of the surface of the forming die, which is suitably adapted to the surface roughness of the glass product, can be maintained for a long period of time, and the surface roughness of the glass product can be regulated to a desired value of, for example, 0.03 $\mu$m or less, which is required for a reflecting mirror substrate. As used herein, the term "surface roughness" refers to the "centerline average roughness Ra" as specified by JIS B0601.

A reflecting mirror substrate can be formed through the following procedure: a glass raw material containing the aforementioned components is melted and formed into a glass product; and the resultant glass product is subjected to heat treatment, to thereby crystallize the glass constituting the product. Crystallization treatment of the glass product is performed in a heating furnace. Typically, the glass product is heated at a rate of 100 to 300° C./hr to a temperature lower than the deformation temperature of the glass (e.g., 600 to 750° C.) and heat treatment is performed at this temperature for one to three hours; and subsequently, the glass product is further heated to 800 to 1,100° C. and heat treatment is performed at this temperature for one to three hours. The latter heat treatment is main crystallization treatment, and the temperature at which the crystallization treatment is performed is called "crystallization temperature."

Through this heat treatment, fine, uniform crystals are generated in the glass constituting the glass product, and the glass product is transformed into a glass-ceramic (i.e., a substrate) containing no hexacelsian crystals or very small amounts of hexacelsian crystals; i.e., a glass-ceramic whose crystal phase is substantially formed of celsian alone. When the amount of $Li_2O$ or the amounts of $Li_2O$ and $K_2O$ in the glass product are varied appropriately, and when the heat treatment temperature (crystallization temperature) is determined appropriately, the glass product can be transformed into a glass-ceramic which is formed of a celsian crystal phase alone and contains no hexacelsian crystal phase.

A multi-layer thin reflection film is deposited on the surface of the substrate (reflecting mirror substrate) by means of a typical technique, to thereby form a reflecting mirror. The thus-formed reflecting mirror reflects scattering light at high reflectance, and transmits infrared rays. The infrared rays which pass through the reflecting mirror are scattered by means of the crystal structure of the glass-ceramic, thereby preventing an increase in the temperature of parts to be provided at the back of the reflecting mirror.

The reflecting mirror substrate of the present invention is formed from a glass-ceramic containing substantially a crystal phase of celsian alone, has a thermal expansion coefficient $\alpha$ ($\times 10^{-7}$/°C.) in a range of as low as 30 to 45, and exhibits excellent heat resistance. Therefore, the reflecting mirror exhibits excellent thermal shock resistance, and can be employed at high temperature. In addition, since the size of crystal grains in the glass ceramic constituting the substrate can be reduced to a range of 0.1 to 1.0 $\mu$m; i.e., very fine crystal grains can be obtained, the reflectance of the reflecting mirror can further be improved.

The present invention provides a first high-quality reflecting mirror substrate of high durability exhibiting excellent mechanical properties and thermal properties, and having a flexural strength in a range of 125 to 155 Mpa at room temperature, in a range of 145 to 175 Mpa at 300° C., and in a range of 180 to 220 Mpa at 600° C., and an elastic modulus in a range of 80 to 85 Gpa at room temperature, in a range of 70 to 75 Gpa at 300° C., and in a range of 35 to 40 Gpa at 600° C.

The present invention also provides a second high-quality reflecting mirror substrate exhibiting excellent optical properties, in which the shortest wavelength of light which passes through a glass-ceramic constituting the substrate is at least 800 nm when the glass-ceramic has a thickness of 0.1 mm, and the wavelength of light which passes, at a transmittance of 50%, through the glass-ceramic constituting the substrate is at least 850 nm when the glass-ceramic has a thickness of 0.1 mm.

The present invention also provides a third high-quality reflecting mirror substrate exhibiting excellent mechanical properties, thermal properties, and optical properties, and having a flexural strength in a range of 125 to 155 Mpa at room temperature, in a range of 145 to 175 Mpa at 300° C., and in a range of 180 to 220 Mpa at 600° C., and an elastic modulus in a range of 80 to 85 Gpa at room temperature, in a range of 70 to 75 Gpa at 300° C., and in a range of 35 to 40 Gpa at 600° C., in which the shortest wavelength of light which passes through a glass-ceramic constituting the substrate is at least 800 nm when the glass-ceramic has a thickness of 0.1 mm, and the wavelength of light which passes, at a transmittance of 50%, through the glass-ceramic constituting the substrate is at least 850 nm when the glass-ceramic has a thickness of 0.1 mm.

A preferred embodiment of the reflecting mirror substrate of the present invention has the aforementioned flexural strength and elastic modulus, and a thickness of 3 to 6 mm, and the shortest wavelength of light which passes through a glass-ceramic constituting the substrate is 850 nm, preferably 1,000 nm. According to the present invention, when the proportions of components of a glass raw material are appropriately varied and when the crystallization temperature is appropriately determined, such a preferred reflecting mirror substrate can be easily formed.

A glass raw material having a melting point of 1,450° C. or lower can be employed for forming the reflecting mirror substrate. When such a glass raw material is employed, in the course of formation of a glass product, the melting temperature of the glass material can be lowered to 1,450° C. or lower, which is considerably lower than the melting temperature of a typical glass raw material (i.e., 1,500° C.).

Therefore, since the forming die for forming the substrate is not used at a temperature as high as at least 1,500° C., oxidation of the surface of the die, which is attributed to heating at high temperature, can be prevented, which prevents roughening of the surface. Therefore, the service life of the forming die is lengthened, resulting in a great reduction of the costs required for preparing a large number of forming dies to be exchanged and the costs required for exchanging forming dies. Furthermore, since roughening of the surface of the forming die can be prevented, the roughness of the surface of the forming die, which is determined in accordance with a desired surface roughness (0.03 $\mu$m or less) of the substrate, can be maintained for a long period of time, and substrates having a surface roughness of 0.03 $\mu$m or less can be reliably formed over a long period of time.

The glass-ceramic constituting the substrate contains $SiO_2$, $Al_2O_3$, BaO, and $TiO_2$, which form the basic structure of the glass-ceramic. The amounts of $SiO_2$, $Al_2O_3$, BaO, and $TiO_2$ preferably fall within the ranges of 35 to 55 wt. %, 7 to 25 wt. %, 18 to 38 wt. %, and 8 to 15 wt. %, respectively. The amount of $Li_2O$ (an essential modification component) contained in the glass-ceramic is in a range of 0.05 to 1.0 wt. %. $K_2O$ (another modification component) is preferably present in the glass-ceramic.

In the glass-ceramic, $K_2O$ functions as a crystallization aid, but, depending on the $K_2O$ content, hexacelsian crystals may precipitate, along with celsian crystals. Therefore, in order to cause the glass-ceramic constituting the substrate to contain substantially a celsian crystal phase alone, the $K_2O$ content of the glass-ceramic must be determined appropriately.

In order to reduce precipitation of hexacelsian crystals to a minimal level, the $K_2O$ content of the glass-ceramic is determined to be 1.5 wt. % or less, preferably 1 wt. % or less, and more preferably 0.5 wt. % or less. However, since $K_2O$ has the ability to precipitate celsian crystals at low temperature, the glass-ceramic preferably contains $K_2O$ in an amount of at least 50 ppm.

Preferred examples of additional modification components include ZnO, $Bi_2O_3$, $Na_2O$, and $Sb_2O_3$. ZnO reduces the thermal expansion coefficient of glass, and enhances chemical durability of the glass. The ZnO content of the glass is preferably in a range of 0.5 to 5 wt. %. $Bi_2O_3$ facilitates melting and refining of glass, and reduces the viscosity of the glass without affecting the thermal expansion coefficient. The $Bi_2O_3$ content of the glass is preferably in a range of 0.5 to 7 wt. %.

$Na_2O$ facilitates melting and refining of glass, but reduces chemical durability of the glass, and increases the thermal expansion coefficient of the glass. The $Na_2O$ content of the glass is preferably in a range of 0.5 to 3 wt. %. $Sb_2O_3$ reacts with oxygen from a nitrate at low temperature to thereby form $Sb_2O_5$, and the resultant $Sb_2O_5$ releases $O_2$ in melted glass so as to refine the glass. The $Sb_2O_3$ content of the glass is preferably in a range of 0.1 to 1 wt. %.

The glass-ceramic constituting the substrate contains a crystal phase substantially formed of celsian crystals alone. The grain size of the crystals (crystal grain size) is preferably in a range of 0.1 to 1 µm, more preferably in a range of 0.1 to 0.5 µm. When the crystal grain size is less than 0.1 µm, the strength of the substrate, which constitutes a reflecting mirror, is lowered, whereas when the crystal grain size exceeds 1 µm, a reflecting mirror including the substrate causes lowering of the intensity of light reflected from the mirror. When the crystal grain size is 0.5 µm, blue light (i.e., light of short wavelength) of reflected light scatters.

In a reflecting mirror including the substrate of the present invention, a glass-ceramic constituting the substrate contains the aforementioned components and is substantially formed of a celsian crystal phase alone. The thermal expansion coefficient α ($\times 10^{-7}$/°C.) of the glass-ceramic can be in a range of 30 to 45, and the crystal grain size of the glass-ceramic can be in a range of 0.1 to 1.0 µm.

Therefore, as compared with the reflecting mirror disclosed in the aforementioned publication previously filed by the present applicant, the above reflecting mirror exhibits improved mechanical strength. In addition, the surface roughness of the reflecting mirror is further improved by virtue of fine crystal grains and uniform crystal grain size, to thereby reduce polishing of the surface, and the heat resistance and heat-resistant properties of the reflecting mirror are improved by virtue of the glass-ceramic substantially formed of a celsian crystal phase alone. Particularly, the reflecting mirror is improved in terms of impact resistance against thermal stress, and the appropriate optical properties, such as reduction of transmittance of visible light, can be attained.

Figure 3:
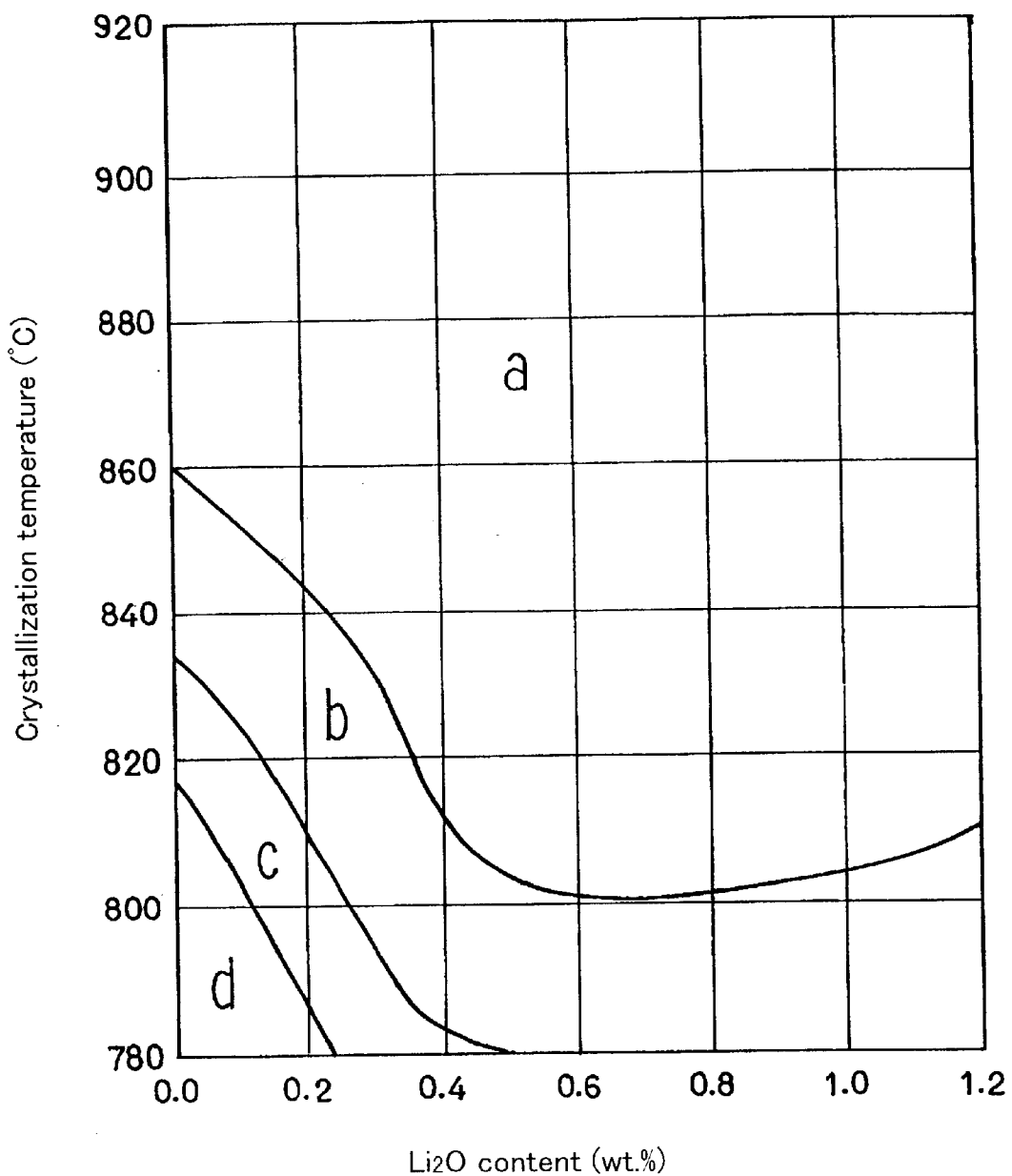
FIG. 3 is a graph showing the relationship between the amount of $Li_2O$ constituting a glass product and the crystallization temperature and crystal phase of the glass product, when the amount of $K_2O$ constituting the glass product is 0.5 wt. % or less.
Figure 4:
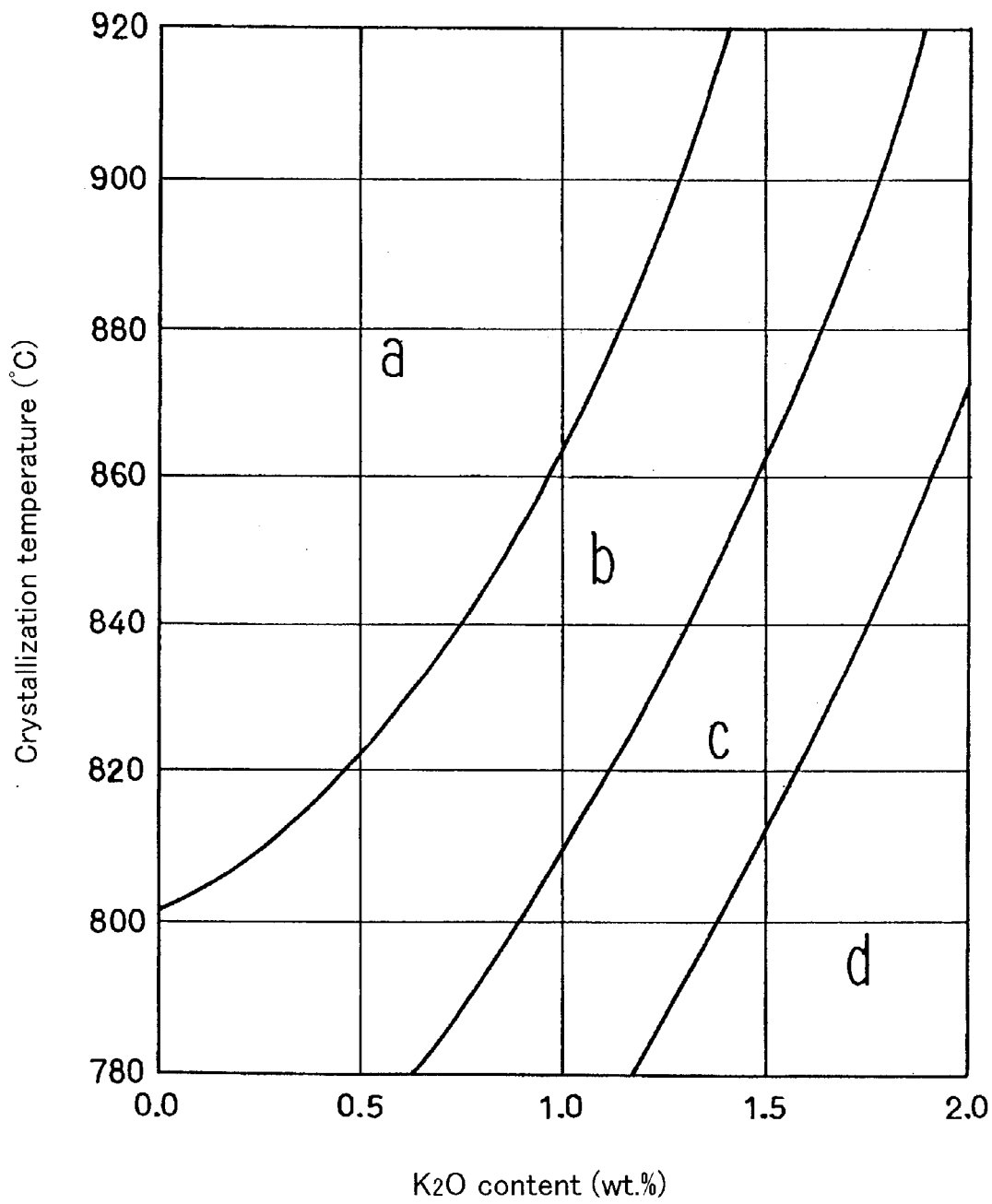
FIG. 4 is a graph showing the relationship between the amount of $K_2O$ constituting a glass product and the crystallization temperature and crystal phase of the glass product, when the amount of $Li_2O$ constituting the glass product is constant (0.4 wt. %).

FIGS. 3 and 4 are graphs showing the results of Test 3 and Test 4 in the below-described Example, respectively. The graph of FIG. 3 shows the relationship between the amount of $Li_2O$ constituting the glass product, and the crystallization temperature and crystal phase of the glass product, when the amount of $K_2O$ constituting the glass product is 0.5 wt. % or less. The graph of FIG. 4 shows the relationship between amount of $K_2O$ constituting the glass product, and the crystallization temperature and crystal phase of the glass product, when the amount of $Li_2O$ constituting the glass product is held constant (0.4 wt. %).

Each of these graphs is divided into four regions: region a, region b, region c, and region d. In region a, a celsian crystal phase alone is present. In region b, a celsian crystal phase and a hexacelsian crystal phase are present, and the amount of celsian crystals is greater than that of hexacelsian crystals. In region c, a celsian crystal phase and a hexacelsian crystal phase are present, and the amount of celsian crystals is less than that of hexacelsian crystals. In region d, a hexacelsian crystal phase alone is present.

As shown in the graph of FIG. 3, when the amount of $K_2O$ constituting the glass product falls within a range of 0 to 0.5 wt. %, the glass product can be transformed into a glass-ceramic containing a celsian crystal phase alone by appropriately varying the amount of $Li_2O$ constituting the glass product and by appropriately determining the crystallization temperature. As shown in the graph of FIG. 4, when the amount of $Li_2O$ constituting a glass product is held constant, the glass product can be transformed into a glass-ceramic containing a celsian crystal phase alone by appropriately varying the amount of $K_2O$ constituting the glass product and by appropriately determining the crystallization temperature. When the amounts of $Li_2O$ and $K_2O$ and the crystallization temperature are determined, meltability of a glass raw material must be considered.

Figure 5:
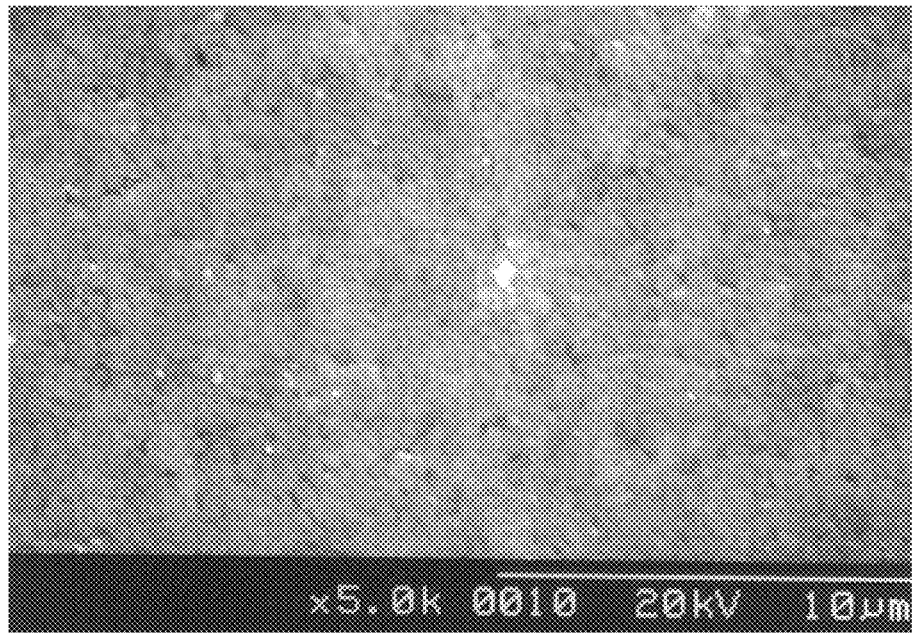
FIG. 5 shows two electron micrograph views of the inner surface of a product formed from a glass-ceramic.
Figure 5:
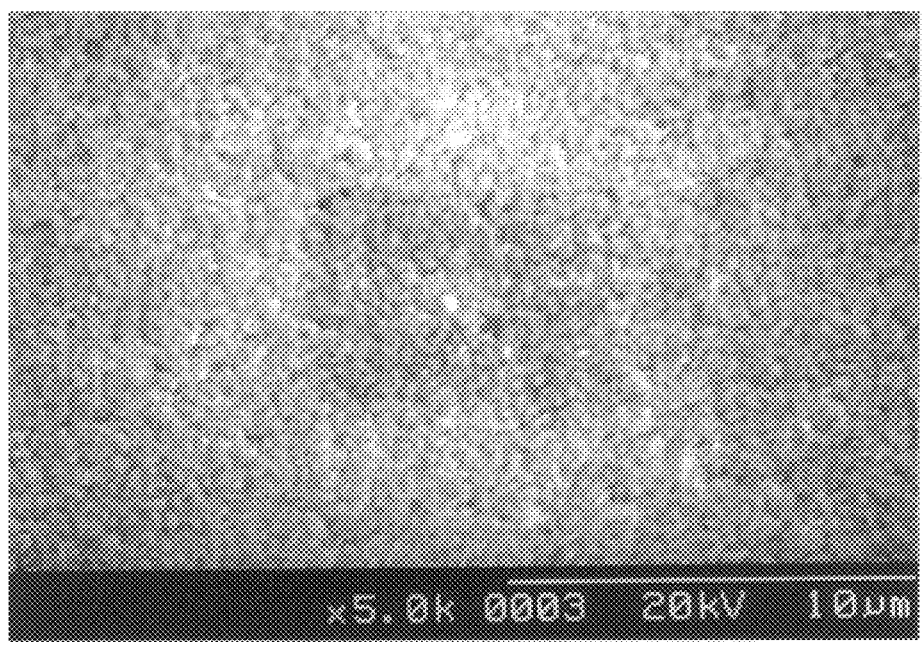
Figure 6:
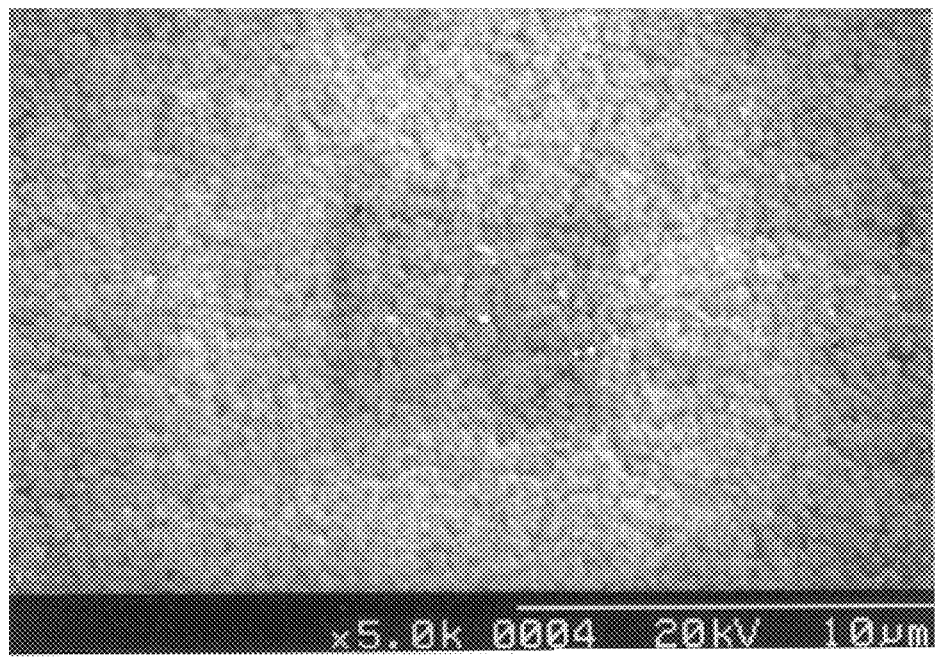
FIG. 6 shows two electron micrograph views of the inner surface of the product which has been crystallized at a temperature different from that of FIG. 5.
Figure 6:
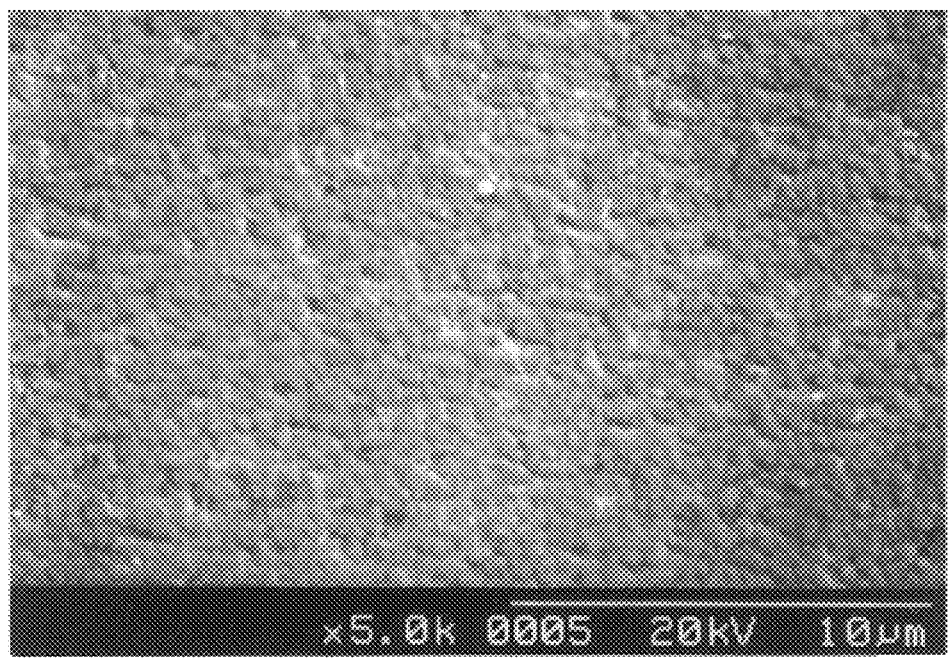
Figure 7:
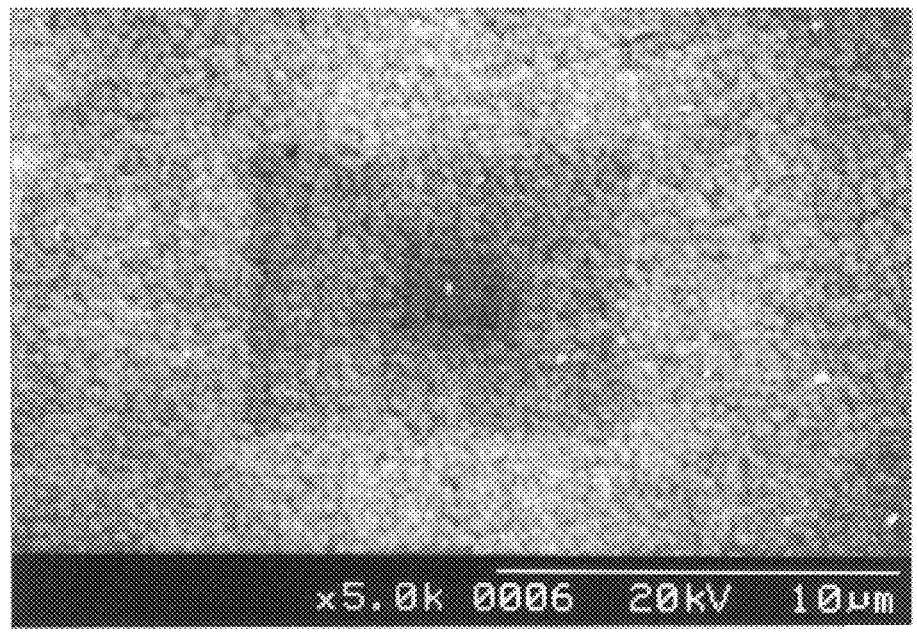
FIG. 7 shows two electron micrograph views of the inner surface of the product which has been crystallized at a temperature different from those of FIGS. 5 and 6.
Figure 7:
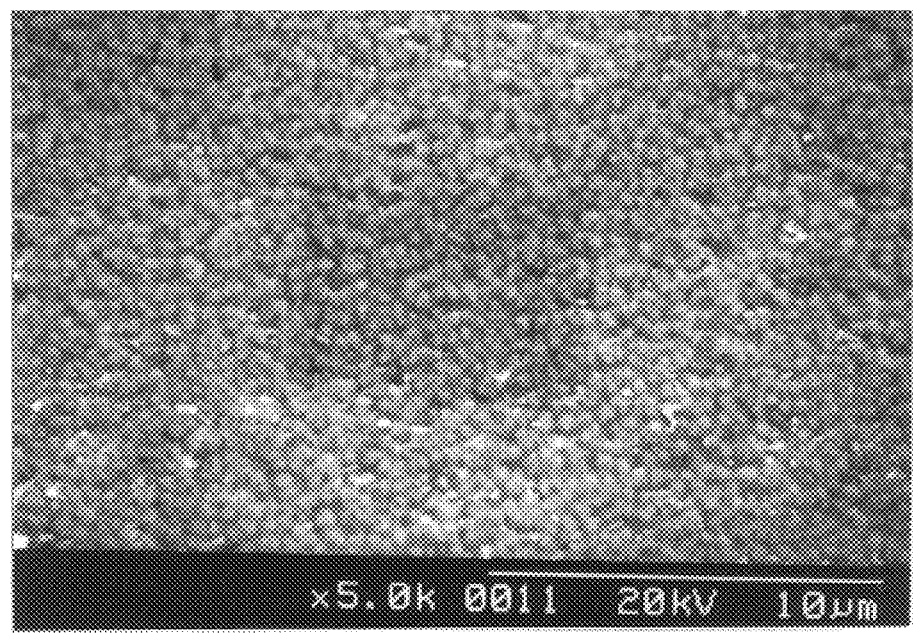
Figure 8:
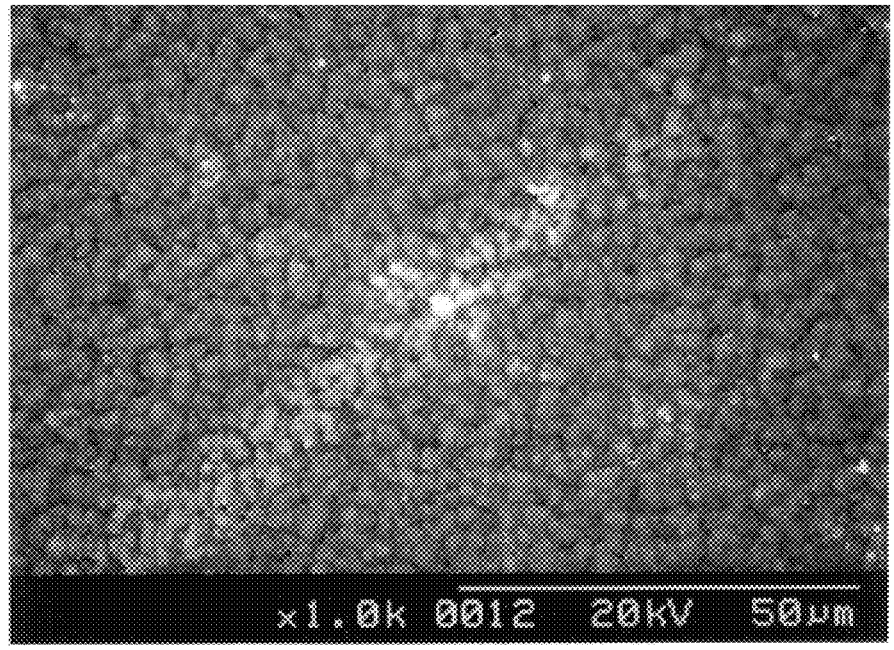
FIG. 8 shows two electron micrograph views of the inner surface of another product formed from a glass-ceramic of another composition.
Figure 8:
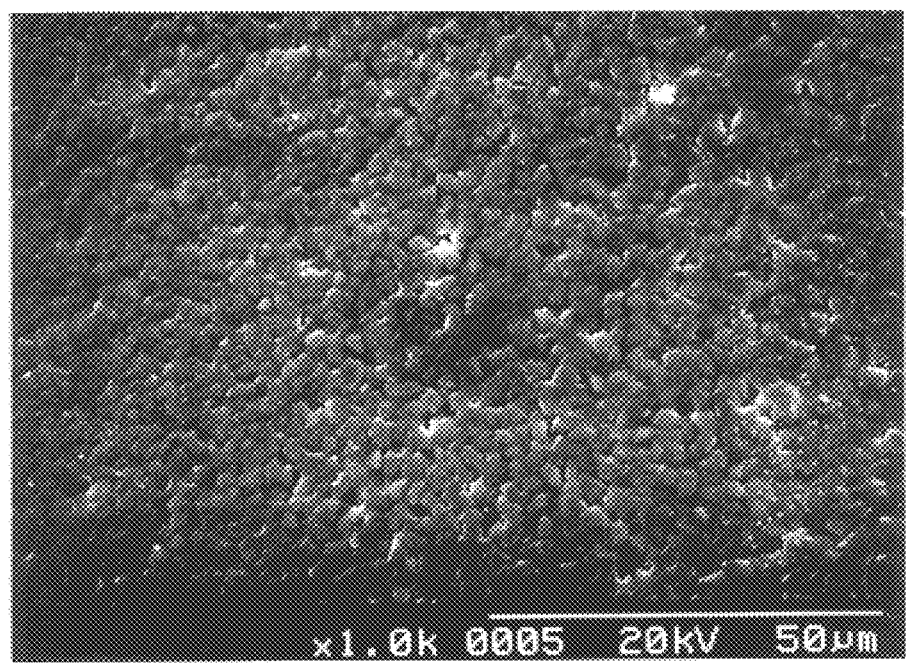
Figure 9:
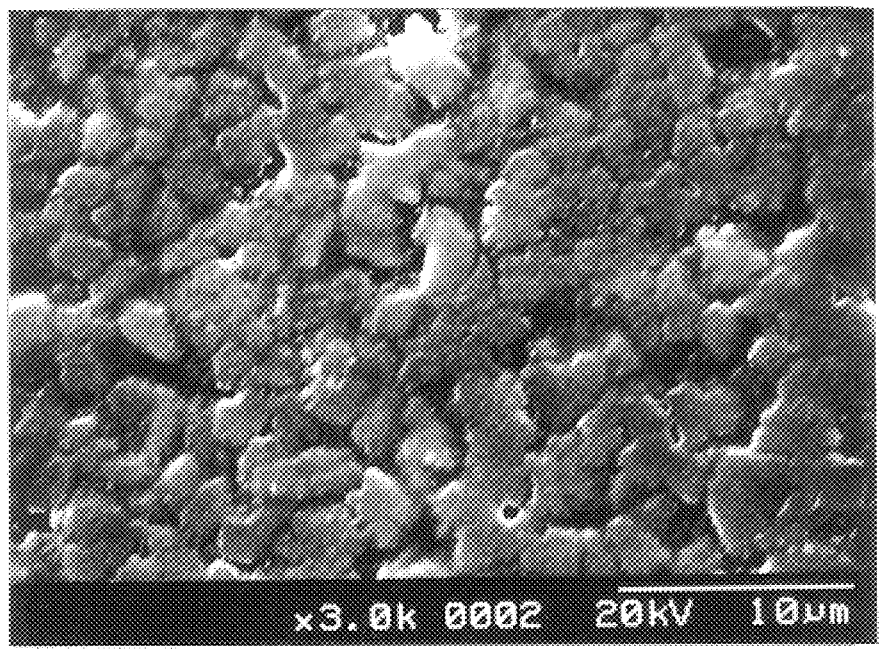
FIG. 9 shows two electron micrograph views of the inner surface of the other product, the micrographs being taken at a different magnification.
Figure 9:
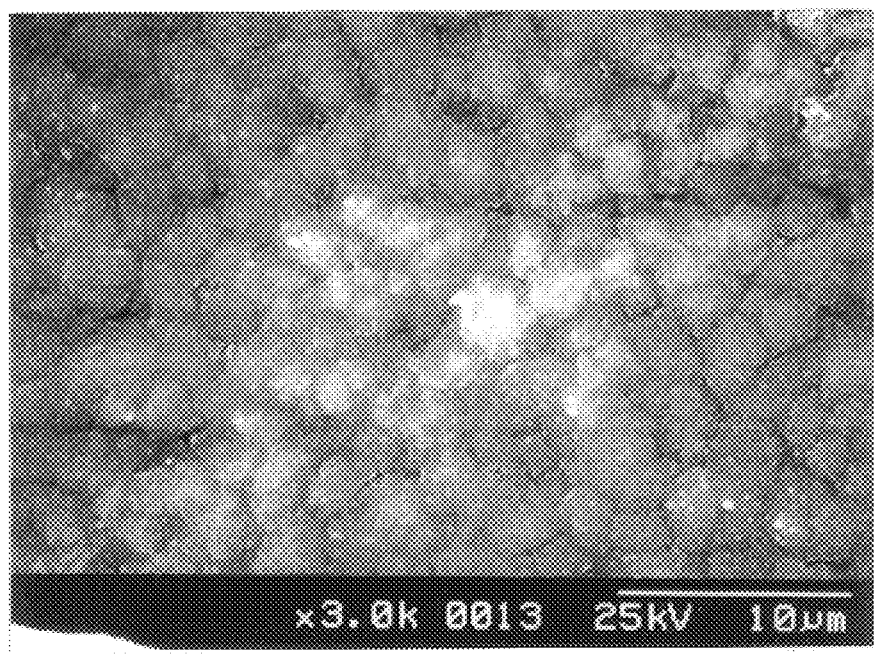

FIGS. 5, 6, and 7 are electron micrographs of the inner surfaces of bowl-shaped products formed from glass-ceramics prepared in Test 3. FIGS. 8 and 9 are electron micrographs of the inner surfaces of other bowl-shaped products formed from glass-ceramics prepared in Test 3.

The electron micrographs of FIG. 5 show the configuration of the inner surface of a bowl-shaped glass product No. 20 ($Li_2O$ content: 0.41 wt. %, $K_2O$ content: 0.49 wt. %, crystallization temperature: 800° C.) in Test 3, taken at the opening and the center of the bowl-shaped product. The electron micrographs of FIG. 6 show the configuration of the inner surface of a bowl-shaped glass product No. 21 ($Li_2O$ content: 0.41 wt. %, $K_2O$ content: 0.49 wt. %, crystallization temperature: 850° C.) in Test 3, taken at the opening and the center of the bowl-shaped product. The electron micrographs of FIG. 7 show the configuration of the inner surface of a bowl-shaped glass product No. 22 ($Li_2O$ content: 0.41 wt. %, $K_2O$ content: 0.49 wt. %, crystallization temperature: 900° C.) in Test 3, taken at the opening and the center of the bowl-shaped product.

The electron micrographs of FIGS. 8 and 9 show the configuration of the inner surface of a bowl-shaped glass product No. 25 ($Li_2O$ content: 0.00 wt. %, $K_2O$ content: 0.00 wt. %, crystallization temperature: 900° C.) in Test 3, taken at the opening and the center of the bowl-shaped product. The electron micrographs of FIGS. 8 and 9 are taken at magnifications of 1,000 and 3,000, respectively.

In these electron micrographs, the expressions "×1.0 k," "×3.0 k," and "×5.0 k" refer to a magnification of 1,000×, a magnification of 3,000×, and a magnification of 5,000×, respectively; the expressions "20 kV" and "25 kV" refer to acceleration voltages; and the expressions "10 µm" and "50 µm" refer to the scales of white lines. Comparison of the crystal grain sizes on the basis of the scales reveals that the size of crystal grains in the inner surface of the glass product containing appropriate amounts of $Li_2O$ and $K_2O$ is considerably smaller than that of crystal grains in the inner surface of the glass product containing no $Li_2O$ and $K_2O$. The results show that the size of crystal grains in the former glass product falls within a range of 0.1 to 1.0 µm, and the size of crystal grains in the latter glass product exceeds 1.0 µm.

Figure 10:
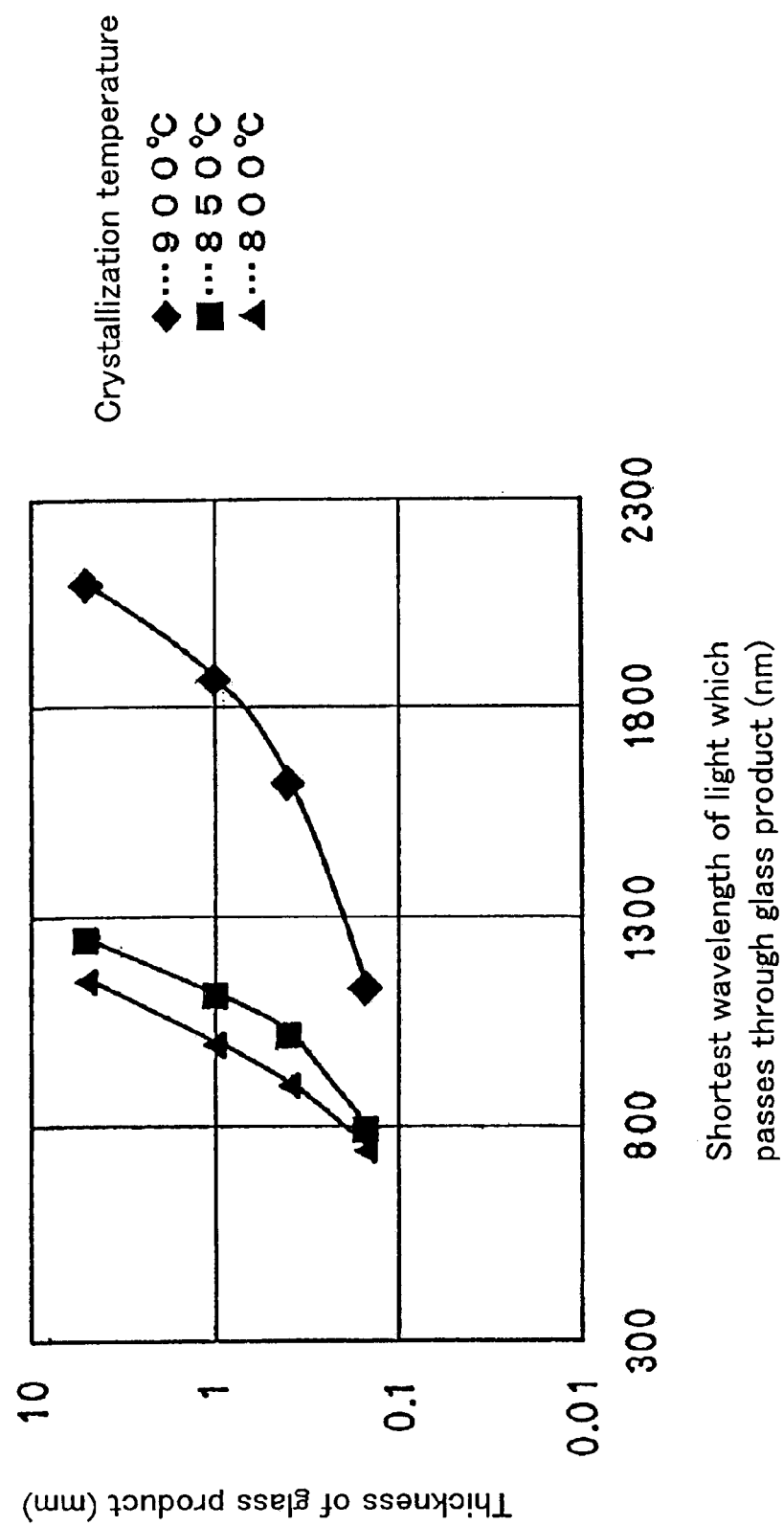
FIG. 10 is a graph showing the relationship between the shortest wavelength of light which passes through a product formed from a glass-ceramic and the thickness of the product.

FIG. 10 is a graph showing the spectroscopic properties of plate-like glass products formed from glass-ceramics. The graph shows the relation between thicknesses (mm) of the plate-like glass products, the shortest wavelengths (nm) of light which passes through the products, and the crystallization temperatures. The products having different thicknesses and are formed and crystallized under the same conditions as employed for the glass product No. 20 (crystallization temperature: 800° C.), the glass product No. 21 (crystallization temperature: 850° C.), and the glass product No. 22 (crystallization temperature: 900° C.) in Test 3.

As shown in the graph of FIG. 10, regulating the crystallization temperature enables the formation of different glass products, which differ in terms of the shortest wavelengths of light which passes therethrough. In addition, when the crystallization temperature is increased, the shortest wavelength of light which passes through the resultant glass product is shifted to a longer wavelength side. When a glass product of glass-ceramic is employed as a reflecting mirror substrate, the substrate preferably transmits no visible light or very little visible light. In such a reflecting mirror substrate exhibiting preferable optical properties, the shortest wavelength of light which passes through a glass-ceramic constituting the substrate is at least 800 nm when the glass-ceramic has a thickness of 0.1 mm. The glass-ceramic can be easily obtained by regulating the crystallization temperature of a glass product.

Figure 11:
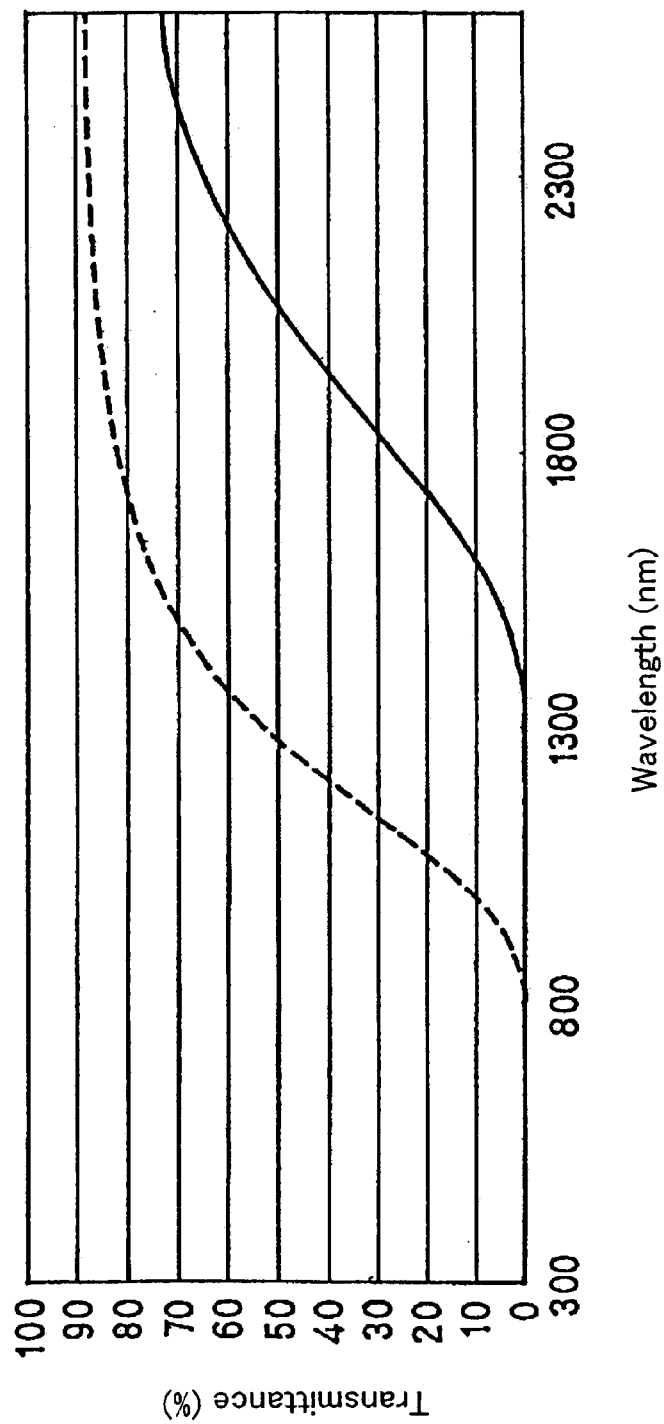
FIG. 11 is a graph showing the relationship between the wavelength and transmittance of light which passes through a product formed from a glass-ceramic.
Figure 12:
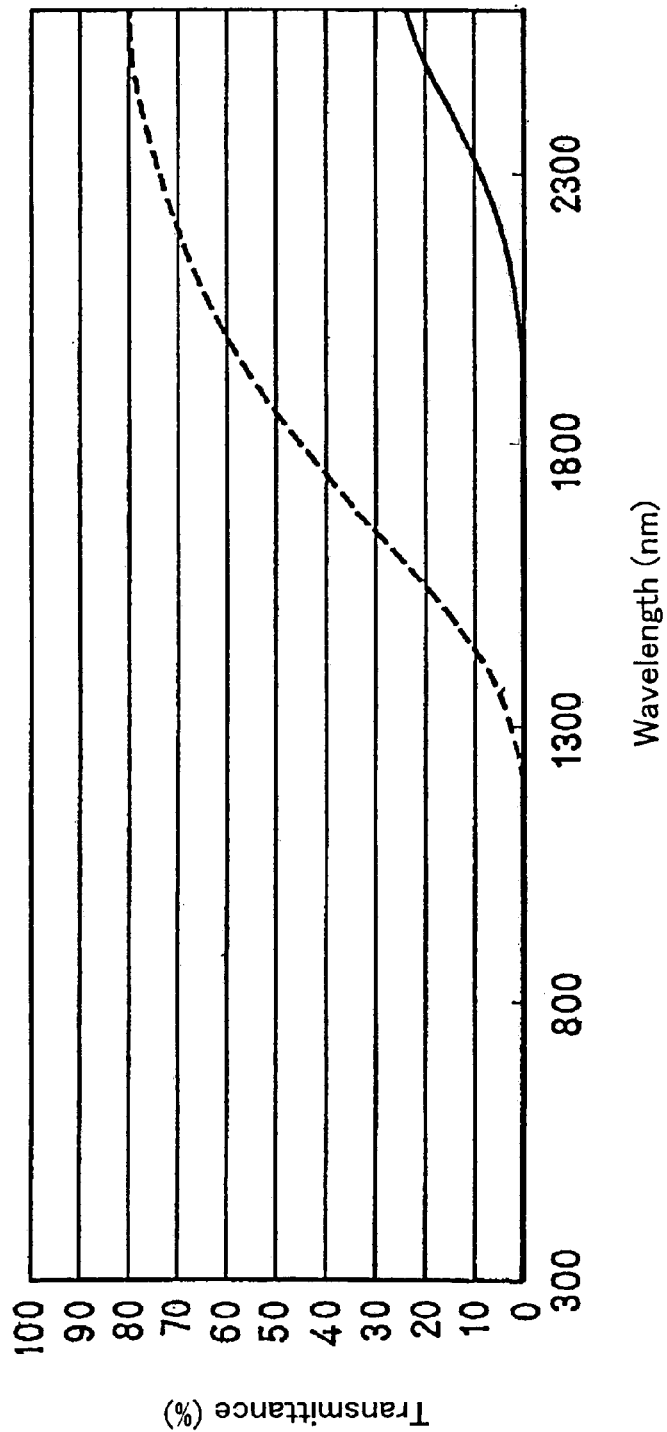
FIG. 12 is a graph showing the relationship between the wavelength and transmittance of light which passes through a product formed from a glass-ceramic.

FIGS. 11 and 12 are graphs showing spectroscopic properties of plate-like glass products formed from glass-ceramics. The graphs show the relationship between the wavelengths (nm) of light which passes through plate-like glass products and the transmittances (%) of the light, the products having thicknesses of 0.1 mm and 5.0 mm and being formed and crystallized under the same conditions as employed for the glass product No. 21 (crystallization temperature: 850° C.) and the glass product No. 22 (crystallization temperature: 900° C.) in Test 3.

As shown in the graphs of FIGS. 11 and 12, regulating the crystallization temperature enables formation of glass products having different light transmittances. In addition, the higher the crystallization temperature, the lower the light transmittance of the resultant glass product. When a glass product of glass-ceramic is employed as a reflecting mirror substrate, the substrate preferably transmits no visible light or very little visible light. In such a reflecting mirror substrate exhibiting preferable optical properties, the wavelength of light which passes, at a transmittance of 50%, through a glass-ceramic constituting the substrate is at least 850 nm when the glass-ceramic has a thickness of 0.1 mm. The glass-ceramic can be easily obtained by regulating the crystallization temperature of the glass product.

When the crystallization temperature of glass products is regulated, glass-ceramic products exhibiting different optical properties can be obtained. Through regulation of crystallization temperature, glass-ceramic products exhibiting different levels of flexural strength (Mpa) and elastic modulus (Gpa) can be obtained. A reflecting mirror substrate is used at a considerably high temperature, attributed to heat from a light source lamp, for a long period of time. Therefore, even when a glass-ceramic product is employed as a reflecting mirror substrate, preferably, the substrate maintains high mechanical strength over a long period of time. Such a reflecting mirror substrate exhibiting preferable mechanical properties and thermal properties has flexural strength and elastic modulus satisfying the following.

The reflecting mirror substrate has a flexural strength of 125 to 155 Mpa at room temperature, 145 to 175 Mpa at 300° C., and 180 to 220 Mpa at 600° C., and an elastic modulus of 80 to 85 Gpa at room temperature, 70 to 75 Gpa at 300° C., and 35 to 40 Gpa at 600° C. Such a preferable reflecting mirror substrate can be easily obtained by regulating the crystallization temperature.

EXAMPLE

In the present Example, various glass raw materials containing $SiO_2$, $Al_2O_3$, BaO, and $TiO_2$ as primary components and $Li_2O$, $K_2O$, etc. as modification components were prepared. In Tests 1, 2, 3, and 4, glass-ceramics were formed from the glass raw materials; glass properties of the resultant glass products and glass-ceramics were evaluated; and the relationship between the amounts of $Li_2O$ and $K_2O$, crystallization temperature, and the ratio by amount of celsian crystals to hexacelsian crystals were confirmed. Glass-ceramics substantially formed of a celsian crystal phase alone and glass-ceramics substantially formed of a hexacelsian crystal phase alone were selected from the above-formed glass-ceramics; the microstructures of the surfaces (reflection surfaces) of the selected glass-ceramics were observed; and the mechanical properties and optical properties of the glass-ceramics were measured.

(Test 1): In Test 1, glass raw materials were prepared in which the amounts of $SiO_2$, $Al_2O_3$, BaO, and $TiO_2$ serving as primary components were held substantially constant, the amounts of $B_2O_3$, ZnO, and $Li_2O$ serving as modification components were held substantially constant, the amount of $Sb_2O_3$ was zero, and the amounts of $K_2O$ and $Na_2O$ serving as modification components were appropriately varied; glass products were formed from the glass raw materials; and the resultant glass products were subjected to heat treatment (crystallization treatment) at 800° C., 850° C., and 900° C., to thereby form glass-ceramics. The glass properties (meltability, Tg, Td) and thermal expansion coefficient ($\alpha$) of the thus-formed glass-products were measured. The glass properties; i.e., amounts of celsian (Ce) crystals and hexacelsian (HCe) crystals, and thermal expansion coefficient ($\alpha$), at the above crystallization treatment temperatures of the glass-ceramics were measured.

Table 1 shows the components of the glass raw materials employed in Test 1, and Table 2 shows properties of the glass products formed from the glass raw materials and the glass-ceramics. Meltability of the glass products was evaluated on the basis of two ratings: O good meltability, x poor meltability (i.e., a small amount of a non-melted substance was observed), and the results are shown in Table 2. The symbols "Tg" and "Td" in relation to properties of the glass products refer to glass transition point (°C.) and glass deformation point (°C.), respectively. The symbols "Ce" and "HCe" in relation to properties of the glass-ceramics refer to the intensity (cps) of the first peak of celsian and hexacelsian as measured by means of X-ray diffraction, respectively. The ratio of the peak intensities of celsian and hexacelsian directly shows the ratio of the amounts of celsian crystals and hexacelsian crystals.

TABLE 1

Glass raw materials (percentage of components)

| Component | Glass raw materials | | | |
|---|---|---|---|---|
| | 1 | 2 | 3 | 4 |
| $SiO_2$ | 40.17 | 40.33 | 40.74 | 41.16 |
| $Al_2O_3$ | 16.16 | 16.22 | 16.39 | 16.56 |
| BaO | 24.52 | 24.61 | 24.86 | 25.12 |
| $TiO_2$ | 11.25 | 11.29 | 11.41 | 11.53 |
| $B_2O_3$ | 3.21 | 3.23 | 3.26 | 3.29 |
| ZnO | 2.12 | 2.22 | 2.24 | 2.26 |
| $K_2O$ | 1.45 | 1.21 | 0.61 | 0.00 |
| $Na_2O$ | 0.95 | 0.81 | 0.41 | 0.00 |
| $Sb_2O_3$ | 0.00 | 0.00 | 0.00 | 0.00 |
| $Li_2O$ | 0.08 | 0.08 | 0.08 | 0.08 |
| Total | 100.0 | 100.0 | 100.0 | 100.0 |

TABLE 2

Glass properties

| Properties | | Glass raw materials | | | |
|---|---|---|---|---|---|
| | | 1 | 2 | 3 | 4 |
| Glass product | Meltability | o | o | x | x |
| | Tg | 680 | 667 | — | — |
| | Td | 736 | 742 | — | — |
| | α | 62.2 | 60.53 | 53.6 | 49.8 |

TABLE 2-continued

| | | Glass properties | | | |
|---|---|---|---|---|---|
| | | Glass raw materials | | | |
| Properties | | 1 | 2 | 3 | 4 |
| Glass-ceramic (800° C.) | Ce | — | 0 | 0 | 0 |
| | HCe | — | 392 | 0 | 0 |
| | α | — | — | — | — |
| Glass-ceramic (850° C.) | Ce | 1005 | 1325 | 1719 | 1735 |
| | HCe | 2965 | 1283 | 0 | 0 |
| | α | — | 57.0 | 35.0 | 34.7 |
| Glass-ceramic (900° C.) | Ce | 1380 | 1652 | 1446 | 1815 |
| | HCe | 567 | 536 | 0 | 0 |
| | α | 44.0 | 49.3 | 34.5 | 35.7 |

(Test 2): In Test 2, glass raw materials were prepared in which the amounts of $SiO_2$, $Al_2O_3$, BaO, and $TiO_2$ serving as primary components were held substantially constant, the amounts of $B_2O_3$, ZnO, $Li_2O$, and $Sb_2O_3$ serving as modification components were held substantially constant, and the amounts of $K_2O$ and $Na_2O$ serving as modification components were appropriately varied; glass products were formed from the glass raw materials; and the resultant glass products were subjected to heat treatment (crystallization treatment) at 800° C., 850° C., and 900° C., to thereby form glass-ceramics. The glass properties (meltability, Tg, Td) and thermal expansion coefficient (α) of the thus-formed glass products were measured. The glass properties; i.e., amounts of celsian (Ce) crystals and hexacelsian (HCe) crystals, and thermal expansion coefficient (α), at the above crystallization treatment temperatures of the glass-ceramics were measured.

Table 3 shows the components of the glass raw materials employed in Test 2, and Table 4 shows properties of the glass products formed from the glass raw materials and the glass-ceramics. The terms and symbols in Table 4 correspond to those in Table 2.

TABLE 3

| | Glass raw materials (percentage of components) | | | | | | |
|---|---|---|---|---|---|---|---|
| | Glass raw materials | | | | | | |
| Component | 5 | 6 | 7 | 8 | 9 | 10 | 11 |
| $SiO_2$ | 40.00 | 40.32 | 40.65 | 40.98 | 40.26 | 40.42 | 40.58 |
| $Al_2O_3$ | 16.00 | 16.13 | 16.26 | 16.39 | 16.10 | 16.17 | 16.23 |
| BaO | 24.00 | 24.19 | 24.39 | 24.59 | 24.25 | 24.25 | 24.35 |
| $TiO_2$ | 11.20 | 11.29 | 11.38 | 11.48 | 11.27 | 11.32 | 11.36 |
| $B_2O_3$ | 3.20 | 3.23 | 3.25 | 3.28 | 3.22 | 3.23 | 3.25 |
| ZnO | 2.40 | 2.42 | 2.44 | 2.46 | 2.42 | 2.43 | 2.44 |
| $K_2O$ | 1.44 | 0.97 | 0.49 | 0.00 | 0.81 | 0.40 | 0.00 |
| $Na_2O$ | 0.96 | 0.65 | 0.33 | 0.00 | 0.97 | 0.97 | 0.97 |
| $Sb_2O_3$ | 0.40 | 0.40 | 0.41 | 0.41 | 0.40 | 0.40 | 0.41 |
| $Li_2O$ | 0.40 | 0.40 | 0.41 | 0.41 | 0.40 | 0.40 | 0.41 |
| Total | 100.0 | 100.0 | 100.0 | 100.0 | 100.0 | 100.0 | 100.0 |

TABLE 4

| | | Glass properties | | | | | | |
|---|---|---|---|---|---|---|---|---|
| | | Glass raw materials | | | | | | |
| Properties | | 5 | 6 | 7 | 8 | 9 | 10 | 11 |
| Glass product | | | | | | | | |
| Meltability | | ○ | ○ | ○ | ○ | ○ | ○ | ○ |
| Tg | | 653 | 659 | 665 | 661 | 651 | 658 | 660 |
| Td | | 718 | 726 | 735 | 743 | 730 | 727 | 729 |
| α | | 64.3 | 58.2 | 54.0 | 53.1 | 61.4 | 60.0 | 58.2 |
| Glass-ceramic (800° C.) | | | | | | | | |
| | Ce | 0 | 1315 | 1555 | 1429 | 854 | 1445 | 1491 |
| | HCe | 2652 | 800 | 453 | 320 | 1990 | 296 | 498 |
| | α | — | — | — | — | 62.4 | 39.5 | 47.5 |
| Glass-ceramic (850° C.) | | | | | | | | |
| | Ce | 540 | 1537 | 1720 | 1668 | 1523 | 1662 | 1588 |
| | HCe | 3154 | 392 | 0 | 0 | 802 | 0 | 0 |
| | α | — | 46.5 | 41.3 | 36.6 | 44.1 | 41.5 | 40.6 |

TABLE 4-continued

Glass properties

| Properties | Glass raw materials | | | | | | |
|---|---|---|---|---|---|---|---|
| | 5 | 6 | 7 | 8 | 9 | 10 | 11 |
| Glass-ceramic (900° C.) | | | | | | | |
| Ce | 1721 | 1771 | 1811 | 1759 | 1692 | 1661 | 1685 |
| HCe | 755 | 201 | 0 | 0 | 0 | 0 | 0 |
| α | 62.5 | 41.0 | 39.9 | 38.2 | 42.5 | 41.7 | 39.7 |

(Test 3): In Test 3, glass. raw materials were prepared in which the amounts of $SiO_2$, $Al_2O_3$, BaO, $TiO_2$, ZnO, $B_2O_3$, and $Sb_2O3$ were held substantially constant, the amounts of $P_2O_5$ and $Bi_2O_3$ were zero, the amount of $K_2O$ was zero or 0.49 wt. %, and the amounts of $Li_2O$, $K_2O$, and $Na_2O$ were appropriately varied; bowl-shaped glass products to serve as reflecting mirror substrates were formed from the glass raw materials; and the resultant glass products were subjected to heat treatment (crystallization treatment) at different temperatures, so as to transform glasses constituting the products into glass-ceramics, thereby forming reflecting mirror substrates (glass-ceramic products).

The relationship between crystallization temperature and the ratio of crystal phases of each of the resultant glass products was obtained. The results are shown in Tables 5 and 6. The graph of FIG. 3 shows the relationship between $Li_2O$ content, crystallization temperature, and the ratio of crystal phases, when the $K_2O$ content is less than 0.5 wt. %. The electron micrographs of FIGS. 5 through 9 showing the inner surfaces of some glass products were taken.

TABLE 5

Properties of glass products

| Component | Glass raw materials | | | | | | | | |
|---|---|---|---|---|---|---|---|---|---|
| | 12 | 13 | 14 | 15 | 16 | 17 | 18 | 19 | 20 |
| $SiO_2$ | 40.98 | 40.98 | 40.98 | 40.82 | 40.82 | 40.82 | 41.42 | 41.42 | 40.65 |
| $Al_2O_3$ | 16.39 | 16.39 | 16.39 | 16.33 | 16.33 | 16.33 | 16.57 | 16.57 | 16.26 |
| BaO | 24.59 | 24.59 | 24.59 | 24.49 | 24.49 | 24.49 | 24.85 | 24.85 | 24.39 |
| $TiO_2$ | 11.48 | 11.48 | 11.48 | 11.43 | 11.43 | 11.43 | 11.53 | 11.53 | 11.38 |
| $B_2O_3$ | 3.28 | 3.28 | 3.28 | 3.27 | 3.27 | 3.27 | 3.29 | 3.29 | 3.25 |
| ZnO | 2.46 | 2.46 | 2.46 | 2.45 | 2.45 | 2.45 | 2.26 | 2.26 | 2.44 |
| $K_2O$ | 0.00 | 0.00 | 0.00 | 0.00 | 0.00 | 0.00 | 0.00 | 0.00 | 0.49 |
| $Na_2O$ | 0.00 | 0.00 | 0.00 | 0.00 | 0.00 | 0.00 | 0.00 | 0.00 | 0.33 |
| $Sb_2O_3$ | 0.41 | 0.41 | 0.41 | 0.40 | 0.40 | 0.40 | 0.00 | 0.00 | 0.41 |
| $Li_2O$ | 0.41 | 0.41 | 0.41 | 0.82 | 0.82 | 0.82 | 0.08 | 0.08 | 0.41 |
| Crystallization temp. | 800 | 850 | 900 | 800 | 850 | 900 | 850 | 900 | 800 |
| Ce (cps) | 1429 | 1668 | 1759 | 1494 | 1711 | 1746 | 1735 | 1815 | 1555 |
| HCe (cps) | 320 | 0 | 0 | 421 | 0 | 0 | 0 | 0 | 453 |
| Ce ratio (%) | 82 | 100 | 100 | 78 | 100 | 100 | 100 | 100 | 77 |

TABLE 6

Properties of glass products

| Component | Glass raw materials | | | | | | | |
|---|---|---|---|---|---|---|---|---|
| | 21 | 22 | 23 | 24 | 25 | 26 | 27 | 28 |
| $SiO_2$ | 40.65 | 40.65 | 40.75 | 40.75 | 40.75 | 40.66 | 40.66 | 40.66 |
| $Al_2O_3$ | 16.26 | 16.26 | 16.30 | 16.30 | 16.30 | 16.27 | 16.27 | 16.27 |
| BaO | 24.39 | 24.39 | 24.45 | 24.45 | 24.45 | 24.40 | 24.40 | 24.40 |
| $TiO_2$ | 11.38 | 11.38 | 11.41 | 11.41 | 11.41 | 11.38 | 11.38 | 11.38 |
| $B_2O_3$ | 3.25 | 3.25 | 3.26 | 3.26 | 3.26 | 3.26 | 3.26 | 3.26 |
| ZnO | 2.44 | 2.44 | 2.45 | 2.45 | 2.45 | 2.45 | 2.45 | 2.45 |
| $K_2O$ | 0.49 | 0.49 | 0.00 | 0.00 | 0.00 | 0.00 | 0.00 | 0.00 |
| $Na_2O$ | 0.33 | 0.33 | 0.97 | 0.97 | 0.97 | 0.97 | 0.97 | 0.97 |
| $Sb_2O_3$ | 0.41 | 0.41 | 0.41 | 0.41 | 0.41 | 0.41 | 0.41 | 0.41 |
| $Li_2O$ | 0.41 | 0.41 | 0.00 | 0.00 | 0.00 | 0.20 | 0.20 | 0.20 |
| Crystallization temp. | 850 | 900 | 800 | 850 | 900 | 800 | 850 | 900 |
| Ce | 1720 | 1811 | 475 | 1328 | 1650 | 535 | 838 | 1618 |
| HCe | 0 | 0 | 2918 | 692 | 0 | 3647 | 2792 | 0 |
| Ce ratio | 100 | 100 | 14 | 66 | 100 | 13 | 23 | 100 |

(Test-4): In Test 4, glass raw materials were prepared in which the amounts of $SiO_2$, $Al_2O_3$, BaO, $TiO_2$, ZnO, $B_2O_3$, and $Sb_2O_3$ were held substantially constant, the amounts of $P_2O_5$ and $Bi_2O_3$ were zero, the amount of $Li_2O$ was held constant (about 0.4 wt. %), and the amounts of $K_2O$ and $Na_2O$ were appropriately varied; bowl-shaped glass products to serve as reflecting mirror substrates were formed from the glass raw materials; and the resultant glass products were subjected to heat treatment (crystallization treatment) at different temperatures, so as to transform glasses constituting the products into glass-ceramics, thereby forming reflecting mirror substrates (glass-ceramic products). The relationship between crystallization temperature and the ratio of crystal phases of each of the resultant glass products was obtained. The results are. shown in Tables 7 and 8. The graph of FIG. 4 shows the relationship between $K_2O$ content, crystallization temperature, and the ratio of crystal phases, when the $Li_2O$ content is held constant.

properties, and optical properties of the resultant glass products were evaluated. In order to evaluate the mechanical properties and the thermal properties, a glass product (thickness: 3 mm) which had been crystallized at a crystallization temperature of 850° C. was subjected to a four-point bending test (JIS 1601), and the flexural strength and elastic modulus of the product were measured at different temperatures. The results are shown in Table 9.

TABLE 9

| | Mechanical properties | |
|---|---|---|
| Temperature (° C.) | Flexural strength (Mpa) | Elastic modulus (Gpa) |
| Room | 125–155 | 80–85 |

TABLE 7

Properties of glass products

| Component | Glass raw materials | | | | | | | | |
|---|---|---|---|---|---|---|---|---|---|
| | 29 | 30 | 31 | 32 | 33 | 34 | 35 | 36 | 37 |
| $SiO_2$ | 40.98 | 40.98 | 40.98 | 40.65 | 40.65 | 40.65 | 40.57 | 40.57 | 40.57 |
| $Al_2O_3$ | 16.39 | 16.39 | 16.39 | 16.26 | 16.26 | 16.26 | 16.23 | 16.23 | 16.23 |
| BaO | 24.59 | 24.59 | 24.59 | 24.39 | 24.39 | 24.39 | 24.34 | 24.34 | 24.34 |
| $TiO_2$ | 11.48 | 11.48 | 11.48 | 11.38 | 11.38 | 11.38 | 11.36 | 11.36 | 11.36 |
| $B_2O_3$ | 3.28 | 3.28 | 3.28 | 3.25 | 3.25 | 3.25 | 3.25 | 3.25 | 3.25 |
| ZnO | 2.46 | 2.46 | 2.46 | 2.44 | 2.44 | 2.44 | 2.44 | 2.44 | 2.44 |
| $K_2O$ | 0.00 | 0.00 | 0.00 | 0.49 | 0.49 | 0.49 | 0.60 | 0.60 | 0.60 |
| $Na_2O$ | 0.00 | 0.00 | 0.00 | 0.33 | 0.33 | 0.33 | 0.41 | 0.41 | 0.41 |
| $Sb_2O_3$ | 0.41 | 0.41 | 0.41 | 0.41 | 0.41 | 0.41 | 0.40 | 0.40 | 0.40 |
| $Li_2O$ | 0.41 | 0.41 | 0.41 | 0.41 | 0.41 | 0.41 | 0.40 | 0.40 | 0.40 |
| Crystallization temp. | 800 | 850 | 900 | 800 | 850 | 900 | 800 | 850 | 900 |
| Ce | 1429 | 1668 | 1759 | 1555 | 1720 | 1811 | 1555 | 1720 | 1811 |
| HCe | 320 | 0 | 0 | 453 | 0 | 0 | 453 | 0 | 0 |
| Ce ratio | 82 | 100 | 100 | 77 | 100 | 100 | 77 | 100 | 100 |

TABLE 8

Properties of glass products

| Component | Glass raw materials | | | | | | | | |
|---|---|---|---|---|---|---|---|---|---|
| | 38 | 39 | 40 | 41 | 42 | 43 | 44 | 45 | 46 |
| $SiO_2$ | 40.32 | 40.32 | 40.32 | 40.01 | 40.01 | 40.01 | 40.00 | 40.00 | 40.00 |
| $Al_2O_3$ | 16.13 | 16.13 | 16.13 | 16.06 | 16.06 | 16.06 | 16.00 | 16.00 | 16.00 |
| BaO | 24.19 | 24.19 | 24.19 | 24.08 | 24.08 | 24.08 | 24.00 | 24.00 | 24.00 |
| $TiO_2$ | 11.29 | 11.29 | 11.29 | 11.17 | 11.17 | 11.17 | 11.20 | 11.20 | 11.20 |
| $B_2O_3$ | 3.23 | 3.23 | 3.23 | 3.19 | 3.19 | 3.19 | 3.20 | 3.20 | 3.20 |
| ZnO | 2.42 | 2.42 | 2.42 | 2.19 | 2.19 | 2.19 | 2.40 | 2.40 | 2.40 |
| $K_2O$ | 0.97 | 0.97 | 0.97 | 1.43 | 1.43 | 1.43 | 1.44 | 1.44 | 1.44 |
| $Na_2O$ | 0.65 | 0.65 | 0.65 | 0.95 | 0.95 | 0.95 | 0.96 | 0.96 | 0.96 |
| $Sb_2O_3$ | 0.40 | 0.40 | 0.40 | 0.40 | 0.40 | 0.40 | 0.40 | 0.40 | 0.40 |
| $Li_2O$ | 0.40 | 0.40 | 0.40 | 0.40 | 0.40 | 0.40 | 0.40 | 0.40 | 0.40 |
| Crystallization temp. | 800 | 850 | 900 | 800 | 850 | 900 | 800 | 850 | 900 |
| Ce | 1315 | 1537 | 1771 | 390 | 1485 | 1184 | 0 | 540 | 1721 |
| HCe | 800 | 392 | 201 | 2775 | 578 | 1838 | | 3154 | 755 |
| Ce ratio | 62 | 80 | 90 | 12 | 72 | 39 | 0 | 15 | 70 |

(Test 5): In Test 5, plate-like glass products (width: 4 mm, length: 40 mm) having different thicknesses were formed and crystallized under the same conditions as employed for a glass product No. 20 (crystallization temperature: 800° C.), a glass product No. 21 (crystallization temperature: 85° C.), and a glass product No. 22 (crystallization temperature: 900° C.) in Test 3, and mechanical properties, thermal TABLE 9-continued Mechanical properties

| Temperature (° C.) | Flexural strength (Mpa) | Elastic modulus (Gpa) |
|---|---|---|
| temperature | | |
| 300 | 145–175 | 70–75 |
| 600 | 180–220 | 35–40 |

In order to evaluate optical properties, for each of glass products (thickness: 0.15 to 5 mm) which had been crystallized at crystallization temperatures of 800° C., 850° C., and 900° C., the relationship between the shortest wavelength of light which passes therethrough and the thickness of the product (i.e., first optical property) was obtained, and the relationship between the wavelengths of light which passes therethrough and the transmittances of the light (i.e., second optical property) was obtained. The results of measurement of the first optical property are shown in Table 10 and the graph of FIG. 10, and the results of measurement of the second optical property are shown in the graphs of FIGS. 11 and 12.

TABLE 10

Shortest wavelength (nm) of light which passes through glass product

| Thickness (mm) | Crystallization temperature (° C.) | | |
|---|---|---|---|
| | 800 | 850 | 900 |
| 5 | 1150 | 1250 | 2100 |
| 1 | 1000 | 1120 | 1870 |
| 0.4 | 900 | 1020 | 1620 |
| 0.15 | 750 | 800 | 1130 |

Obviously, numerous modifications and variations of the present invention are possible in light of the above teachings. It is therefore to be understood that within the scope of the appended claims, the present invention may be practiced otherwise than as specifically described herein.

What is claimed is:

1. A glass-ceramic having celsian as a primary crystal phase, said glass-ceramic comprising $SiO_2$, $Al_2O_3$, BaO, and $TiO_2$ as primary components and $Li_2O$ as a modification component, wherein the amount of $Li_2O$ within a range of 0.05 to 1.0 wt. %.

2. The glass-ceramic according to claim 1, further comprising one or more modification components selected from the group consisting of $Na_2O$, $P_2O_5$, $B_2O_3$, $Sb_2O_3$, ZnO, and $Bi_2O_3$.

3. A glass-ceramic having celsian as a primary crystal phase, said glass-ceramic comprising $SiO_2$, $Al_2O_3$, BaO, and $TiO_2$ as primary components and $Li_2O$ and $K_2O$ as modification components, wherein the amount of $Li_2O$ is within a range of 0.05 to 1.0 wt. %, and the amount of $K_2O$ is 1.5 wt. % or less.

4. The glass-ceramic according to claim 3, further comprising one or more modification components selected from the group consisting of $Na_2O$, $P_2O_5$, $B_2O_3$, $Sb_2O_3$, ZnO, and $Bi_2O_3$.

5. A reflecting mirror substrate on which a thin reflection film is deposited to thereby form a reflecting mirror, said substrate being formed from a glass-ceramic;
said glass-ceramic having celsian as a primary crystal phase, and said glass-ceramic comprising $SiO_2$, $Al_2O_3$, BaO, and $TiO_2$ as primary components and $Li_2O$ as a modification component, wherein the amount of $Li_2O$ is within a range of 0.05 to 1.0 wt. %.

6. The reflecting mirror substrate according to claim 5, wherein said glass-ceramic constituting said substrate further comprises one or more modification components selected from the group consisting of $Na_2O$, $P_2O_5$, $B_2O_3$, $Sb_2O_3$, ZnO, and $Bi_2O_3$.

7. The reflecting mirror substrate according to claim 5, wherein said glass-ceramic constituting said substrate has a thermal expansion coefficient $\alpha(\times 10^{-7}/° C.)$ in a range of 30 to 45.

8. A reflecting mirror substrate on which a thin reflection film is deposited to thereby form a reflecting mirror, said substrate being formed from a glass-ceramic;
said glass-ceramic having celsian as a primary crystal phase said, glass-ceramic comprising $SiO_2$, $Al_2O_3$, BaO, and $TiO_2$ as primary components and $Li_2O$ as a modification component, wherein the amount of $Li_2O$ is within a range of 0.05 to 1.0 wt. %
wherein said glass-ceramic constituting said substrate has a crystal grain size in a range of 0.1 to 1 μm.

9. The reflecting mirror substrate according to claim 5, wherein said reflecting mirror has a flexural strength in a range of 125 to 155 Mpa at room temperature, a flexural strength in a range of 145 to 175 Mpa at 300° C., a flexural strength in a range of 180 to 220 Mpa at 600° C., an elastic modulus in a range of 80 to 85 Gpa at room temperature, an elastic modulus in a range of 70 to 75 Gpa at 300° C., and an elastic modulus in a range of 35 to 40 Gpa at 600° C.

10. The reflecting mirror substrate according to claim 5, wherein the shortest wavelength of light which passes through said glass-ceramic constituting said substrate is at least 800 nm when said glass-ceramic has a thickness of 0.1 mm.

11. The reflecting mirror substrate according to claim 5, wherein the wavelength of light which passes, at a transmittance of 50%, through said glass-ceramic constituting said substrate is at least 850 nm when said glass-ceramic has a thickness of 0.1 mm.

12. The reflecting mirror substrate according to claim 5, wherein said reflecting mirror substrate has a flexural strength in a range of 125 to 155 Mpa at room temperature, a flexural strength in a range of 145 to 175 Mpa at 300° C., a flexural strength in a range of 180 to 220 Mpa at 600° C., an elastic modulus in a range of 80 to 85 Gpa at room temperature, an elastic modulus in a range of 70 to 75 Gpa at 300° C., and elastic modulus in a range of 35 to 40 Gpa at 600° C.;
wherein the shortest wavelength of light which passes through said glass-ceramic constituting said substrate is at least 800 nm when the glass-ceramic has a thickness of 0.1 mm; and
wherein the wavelength of light which passes, at a transmittance of 50%, through said glass-ceramic constituting said substrate is at least 850 nm when said glass-ceramic has a thickness of 0.1 mm.

13. The reflecting mirror substrate according to claim 5, wherein said reflecting mirror substrate has a thickness of 3 to 6 mm, and wherein the shortest wavelength of light which passes through said glass-ceramic constituting said substrate is at least 850 nm.

14. The reflecting mirror substrate according to claim 13, wherein the shortest wavelength of light which passes through said glass-ceramic constituting said substrate is at least 1,000 nm.

15. A reflecting mirror substrate on which a thin reflection film is deposited to thereby form a reflecting mirror, said substrate being formed from a glass-ceramic;

said glass-ceramic having celsian as a primary crystal phase, said glass-ceramic comprising $SiO_2$, $Al_2O_3$, BaO, and $TiO_2$ as primary components and $Li_2O$ and $K_2O$ as modification components, wherein the amount of $Li_2O$ is within a range of 0.05 to 1.0 wt. %, and the amount of $K_2O$ is 1.5 wt. % or less.

16. The reflecting mirror substrate according to claim 15, wherein said glass-ceramic constituting said substrate further comprises one or more modification components selected from the group consisting of $Na_2O$, $P_2O_5$, $B_2O_3$, $Sb_2O_3$, ZnO, and $Bi_2O_3$.

17. The reflecting mirror substrate according to claim 15, wherein said glass-ceramic constituting said substrate has a thermal expansion coefficient $\alpha(\times 10^{-7}/°C.)$ in a range of 30 to 45.

18. A reflecting mirror substrate on which a thin reflection film is deposited to thereby form a reflecting mirror, said substrate being formed from a glass-ceramic;

said glass-ceramic having celsian as a primary crystal phase, said glass-ceramic comprising $SiO_2$, $Al_2O_3$, BaO, and $TiO_2$ as primary components and $Li_2O$ and $K_2O$ as modification components, characterized in that the amount of $Li_2O$ is within a range of 0.05 to 1.0 wt. % and the amount of $K_2O$ is 1.5 wt. % or less;

wherein said glass-ceramic constituting said substrate has a crystal grain size in a range of 0.1 to 1 µm.

19. The reflecting mirror substrate according to claim 15, wherein said reflecting mirror substrate has a flexural strength in a range of 125 to 155 Mpa at room temperature, a flexural strength in a range of 145 to 175 Mpa at 300° C., a flexural strength in a range of 180 to 220 Mpa at 600° C., an elastic modulus in a range of 80 to 85 Gpa at room temperature, an elastic modulus in a range of 70 to 75 Gpa at 300° C., and an elastic modulus in a range of 35 to 40 Gpa at 600° C.

20. The reflecting mirror substrate according to claim 15, wherein the shortest wavelength of light which passes through said glass-ceramic constituting said substrate is at least 800 nm when said glass-ceramic has a thickness of 0.1 mm.

21. The reflecting mirror substrate according to claim 15, wherein the wavelength of light which passes, at a transmittance of 50%, through said glass-ceramic constituting said substrate is at least 850 nm when said glass-ceramic has a thickness of 0.1 mm.

22. The reflecting mirror substrate according to claim 15, wherein said reflecting mirror substrate has a flexural strength in a range of 125 to 155 Mpa at room temperature, a flexural strength in a range of 145 to 175 Mpa at 300° C., a flexural strength in a range of 180 to 220 Mpa at 600° C., an elastic modulus in a range of 80 to 85 Gpa at room temperature, an elastic modulus in a range of 70 to 75 Gpa at 300° C., and an elastic modulus in a range of 35 to 40 Gpa at 600° C.;

wherein the shortest wavelength of light which passes through said glass-ceramic constituting said substrate is at least 800 nm when said glass-ceramic has a thickness of 0.1 mm; and wherein the wavelength of light which passes, at a transmittance of 50%, through said glass-ceramic constituting said substrate is at least 850 nm when said glass-ceramic has a thickness of 0.1 mm.

23. The reflecting mirror substrate according to claim 15, wherein said reflecting mirror substrate has a thickness of 3 to 6 mm, and wherein the shortest wavelength of light which passes through said glass-ceramic constituting said substrate is at least 850 nm.

24. The reflecting mirror substrate according to claim 23, wherein the shortest wavelength of light which passes through said glass-ceramic constituting said substrate is at least 1,000 nm.

* * * * *